(12) United States Patent
Poston

(10) Patent No.: US 8,553,032 B1
(45) Date of Patent: Oct. 8, 2013

(54) GLYPH RENDERING

(75) Inventor: Timothy Poston, Singapore (SG)

(73) Assignee: Animoto, Inc., New York, NY (US)

( * ) Notice: Subject to any disclaimer, the term of this patent is extended or adjusted under 35 U.S.C. 154(b) by 159 days.

(21) Appl. No.: 13/304,119

(22) Filed: Nov. 23, 2011

(51) Int. Cl.
*G06T 15/30* (2011.01)
*G06T 17/20* (2006.01)

(52) U.S. Cl.
USPC ........................................................ 345/423

(58) Field of Classification Search
USPC .................................................. 345/423, 611
See application file for complete search history.

(56) References Cited

U.S. PATENT DOCUMENTS

2003/0025650 A1* 2/2003 Uesaki et al. .................... 345/6

\* cited by examiner

*Primary Examiner* — Aaron M Richer
*Assistant Examiner* — Vu Nguyen
(74) *Attorney, Agent, or Firm* — Hickman Palermo Truong Becker Bingham Wong LLP

(57) ABSTRACT

Techniques are provided for glyph rendering based on a polygon mesh having vertices located away from a glyph's outline. Skeletonisation may be used to establish polygonal skeletons in the interior region of a glyph and in the outside region of the glyph. Transepts oriented away from the glyph's outline may be generated for nodes on the glyph's outline. A polygon mesh may be generated with vertices constrained to be selected from a set of candidate vertices comprising termination points of transepts, skeleton nodes, and/or points on the glyph's bounding boxes. Implicit forms may be determined from curves or lines representing segments of the glyph's outline, without use of Bézier control points and endpoints. These implicit forms along with tessellation data may be provided to a computing device as glyph rendering data for rendering the glyph at runtime.

34 Claims, 18 Drawing Sheets

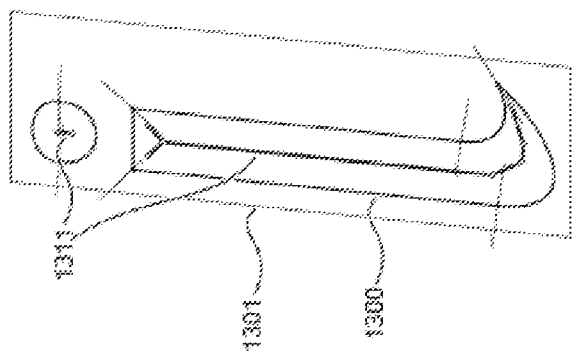
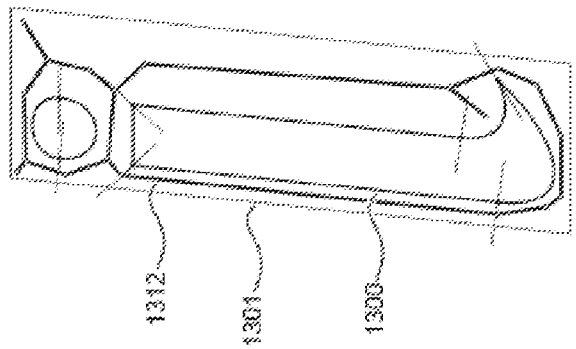
FIG. 13B
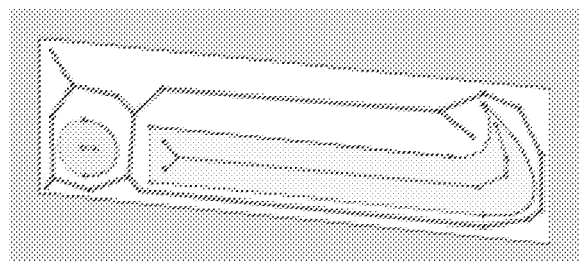
FIG. 13A

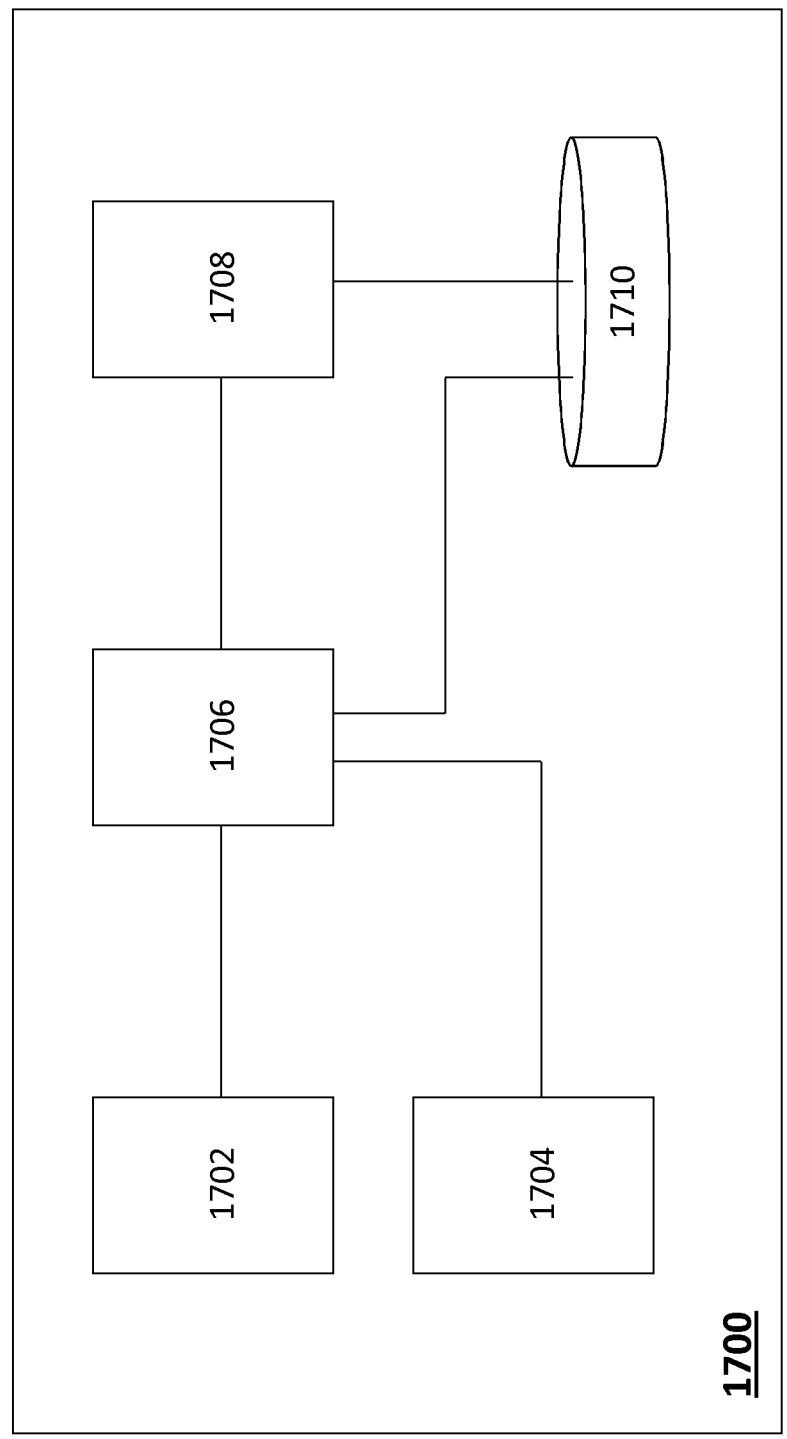

identify a plurality of candidate tessellation vertices in a bounding box of a glyph, each of the candidate tessellation vertices being away from a glyph outline of the glyph 1802 select a plurality of tessellation vertices from the plurality of candidate tessellation vertices to form a polygon mesh that covers the glyph outline of the glyph 1804 generate glyph rendering data based at least in part on the polygon mesh 1808

FIG. 18A receive glyph rendering data for a glyph at runtime, the glyph rendering data comprising tessellation data specifying a plurality of tessellation vertices in a bounding box of the glyph, and implicit form data specifying a plurality of implicit forms each specifying for a corresponding tessellation polygon that contains a corresponding segment in a plurality of segments of a glyph outline of the glyph, wherein the plurality of tessellation vertices are away from the glyph outline of the glyph  1852 render the glyph based on the glyph rendering data  1854

FIG. 18B

GLYPH RENDERING

FIELD OF THE INVENTION

The present disclosure generally relates to glyph rendering in computer graphical displays, and in particular, to rendering glyphs using polygonal tesselations with vertices away from a glyph outline.

BACKGROUND

To enable a computing device to render a glyph on a display device or a medium, a bitmap that defines each pixel within a shape delineating the glyph may be provided to the computer device as a part of glyph rendering data. A disadvantage of this method is that such a bitmap may require storing or processing a large amount of data. Also, separate bitmaps need to be defined for glyphs at different sizes, even if they are related to the same underlying letter or object.

Instead of using such a brute force approach under which each pixel's color is specified in a bitmap of a glyph, Bézier polygons associated with a functional representation of the glyph's outline as a set of Bézier curves may be used for rendering the glyph. See, e.g., Donald Knuth, *Metafont: the Program* (Addison-Wesley 1986), pp. 123-131. However, Bézier polygons often overlap with one another, requiring special complicated treatments of pixels that lie simultaneously in multiple Bézier polygons. Additionally, since Bézier polygons are formed by Bézier endpoints that lie on the glyph's outline, and the Bézier polygons are tangent to the outline at these endpoints, the Bézier polygons have vanishing separation from the Bézier curves near the Bézier endpoints, and thus imperfectly support rendering operations such as anti-aliasing operations that need a sufficiently large neighborhood of pixels near the glyph's outline for proper operation. The vanishing separation of Bézier polygons from the curves also tends to exclude many pixels from all the Bézier polygons; thus these points may be missed in anti-aliasing operations that depend on the Bézier polygons, and will be left to uniformly-filled triangles complementing the Bézier polygons, with uneven effects. These problems are worse when a Bézier polygon degenerates into a long narrow straight box.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

In the drawings:

FIG. 2A, FIG. 2B and FIG. 2C illustrate letter glyphs;

FIG. 13A and FIG. 13B illustrate polygonal skeleta of a glyph, which comprise a first polygonal skeleton for the interior region of the glyph and a second polygonal skeleton for the exterior region of the glyph in a bounding box;

FIG. 17 illustrates a glyph rendering computer;

FIG. 18A illustrates a process flow that may be used to generate glyph rendering data for glyphs, according to an example embodiment;

FIG. 18B illustrates a process flow that may be used to render glyphs based on glyph rendering data as described herein, according to an example embodiment;

DETAILED DESCRIPTION

Figure 1:
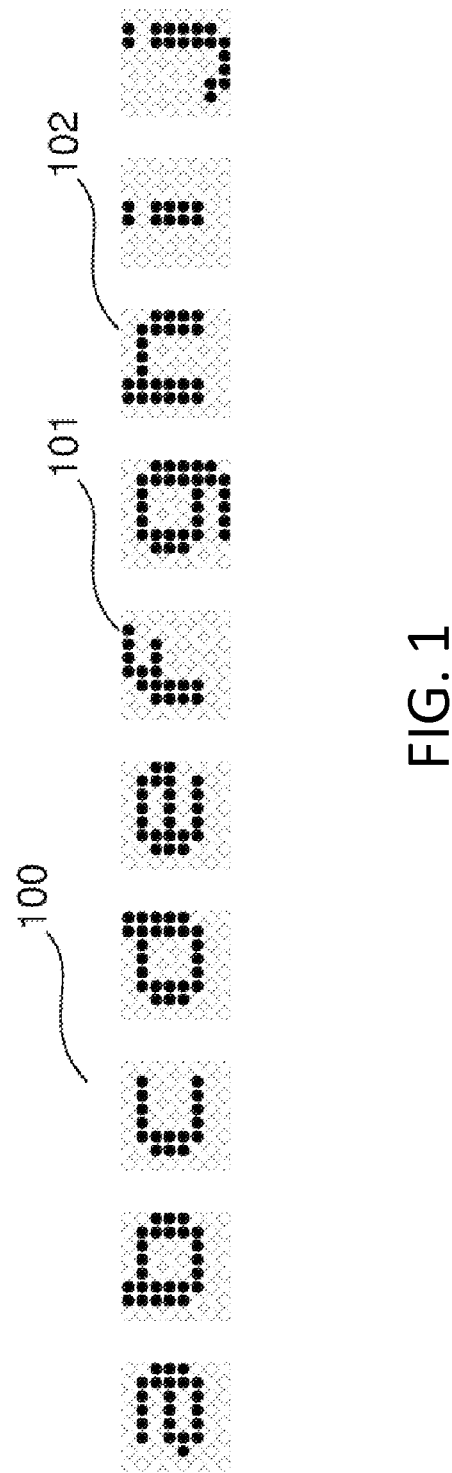
FIG. 1 illustrates letter glyphs based on a low-resolution bit-mapped font.

Glyph rendering with a polygon mesh is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1. General Overview
2. Structural Overview
3. Rendering Operations in the Vicinity of a Glyph Outline
4. Glyph Outline
5. Bézier polygon
6. Glyph Rendering with Bézier polygons
7. Skeleton Construction
8. Transepts
9. Tessellation
10. Glyph Rendering with Polygon Mesh
11. Implicit Forms
12. Normalisation
13. Rasterisation
14. Example Computer-Implemented Processes
15. Implementation Mechanisms—Hardware Example
16. Extensions and Alternatives 1. General Overview In some embodiments, a polygon mesh is generated in a glyph's bounding box. The polygon mesh comprises non-overlapping tessellation polygons having their vertices away from the glyph's outline. The polygon mesh may be generated with one of a variety of available tessellation algorithms including, but not limited only to any of, those based on a Delaunay triangulation subject to constraints.

Tessellations as described herein may be constrained to a set of candidate tessellation vertices located away from a glyph's outline. Within a bounding box of a glyph, skeleta comprising a first skeleton inside the glyph's outline and a second skeleton outside the glyph's outline may be generated. One or more skeleton nodes may be included into the candidate tessellation vertices.

The glyph's outline may be divided into multiple segments that join at nodes located on the glyph's outline. Transepts may be generated at each of the nodes on the glyph's outline. It is preferred that transepts be oriented away from being tangential to the glyph's outline. For example, a transept from a node on the glyph's outline at which two joining segments share a common direction may be oriented with a direction perpendicular or substantially transverse to the direction of the joining segments at the node. Transepts from a node on the glyph's outline at which two joining segments does not share a common direction may be oriented with a direction bisecting an angle formed by the two joining segments. A transept is terminated away from the glyph's outline on both sides of a node through which the transept passes. For example, termination points of the transept may be set to the nearest of the transept's intersection with the skeleta discussed above, or to the transept's closest point of approach to the skeleta's nodes. The termination points of the transepts may be included into the candidate tessellation vertices.

In some embodiments, a tessellation polygon that contains a segment of a glyph's outline comprises transepts as sides. Since the transepts are terminated away from the glyph's outline, and since the transepts are oriented away from being tangential to the glyph's outline, a tessellation polygon generated under techniques as described herein does not have a vanishing separation from the glyph's outline, on either side of that outline. Therefore, without using complicated special treatments or transformations, tessellation polygons under techniques as described herein allows a variety of glyph rendering operations to perform independently in each of the tessellation polygons.

An implicit form for a segment of the glyph's outline may be generated that specifies that segment within the tessellation polygon in which that segment lies. If such a segment is represented by a straight line, quadratic or cubic curve as a polynomial of a parameter, the implicit form may be generated directly from coefficients of the polynomial, without using Bézier control points and endpoints, or parametric transformations that might be degenerate. The implicit form may be normalized or scaled. Values of the implicit form provide information of a signed distance between a point or pixel and the glyph's outline. Hence, glyph rendering operations may assign different color values to different points or pixels in the tessellation polygon based on the respective values of the implicit form at these points or pixels. Scaling of implicit forms may be used to control the behaviors of one or more glyph rendering operations. For example, scaling of implicit forms may be used to control glyph rendering operations to delineate topological features of a glyph, when there are relatively few pixels available for glyph rendering.

Data specifying tessellation polygons such as locations of tessellation vertices may be saved with data defining implicit forms such as coefficients as glyph rendering data. A computing device, a display system, a software tool, an operating system, a web-based application, etc., may be configured with the glyph rendering data generated by a different computing device. At runtime, the glyph rendering data may be used to render a glyph without repeating the process of generating the glyph rendering data. As glyph rendering data under techniques as described herein may be based on a functional representation of a glyph rather than a bitmap that specifies each pixel's color, the glyph rendering data under techniques as described herein may be efficiently used to render a similar glyph through one or more spatial transformations.

2. Structural Overview

A glyph is a letter, a number, a character, etc., in a specific visual form (for example, glyphs "v" and "v" may be of the same letter, but are distinct glyphs). A glyph may be used numerous times in computer-based rendering of graphical displays. Hence, in an embodiment, glyph rendering with a computer should be fast, use the least amount of resources such as memory and computation, and look good. Glyphs may be monochrome or colored.

In embodiments in which glyphs and their backgrounds are monochrome, to render a glyph on a display device that supports various gray levels involves determining what shade of gray each pixel should be. In polychromatic embodiments, it involves determining the color that each pixel should be, as specified by red/green/blue intensities, hue/saturation/brightness, or such another color representation scheme. In embodiments in which a display device does not support intermediate gray levels, rendering involves determining which pixels shall be white or black, as in dot matrix printers and early LCDs.

FIG. 1 illustrates letter glyphs based on a low-resolution bit-mapped font. For purposes of illustrating a clear example, FIG. 1 includes a glyph of the Roman letter "f". Each glyph in a glyph collection 100 may be rendered with glyph data that records a 0 or 1 for each pixel position of an array of pixels used to render the glyph. A pixel 101 in the letter glyph "f" may be indicated as black in the glyph data for the letter glyph "f"., while a pixel 102 in a letter glyph "h" may be indicated as white in glyph data for the letter glyph "h".

Glyph data that directly specify white or black for each pixel of an array of pixels for a glyph constitutes y a "bit map." In an example embodiment, bit maps may be stored tersely by recording only outline pixels where color switches between black and white along a row. A display device may expand the outline pixels into a full set of bit values for an array of pixels used to render a glyph.

A font may be used to collect a set of bit maps together, for example, in typographically useful ways. A set of codes may be assigned to the set of bit maps based on a plurality of stored correspondence relationships (for example, one-to-one mappings) in the font. In a particular embodiment in which glyphs are those of letters, the same sequence of codes for the letters in a character system (for example, ASCII) may be used to label or index a sequence of corresponding glyphs that represent the letters, respectively.

Each glyph in FIG. 1 may be fitted into an 8×8 array of pixels, which limits their possible beauty, and makes expressions like a$^f$ impossible to render. Larger bit maps allow more variety; however, storing best bit maps to use for every possible display size (as measured in pixels) becomes impractically cumbersome.

In some embodiments, instead of directly using 0 and 1 to specify individual colors for an array of pixels for a glyph, an outline of the glyph, as represented by a mathematical, zero-width curve, may be used to define the glyph. Such a zero-width curve may cut across a pixel (which is non-zero finite-sized), as well as traverse between pixels.

Figure 2A:
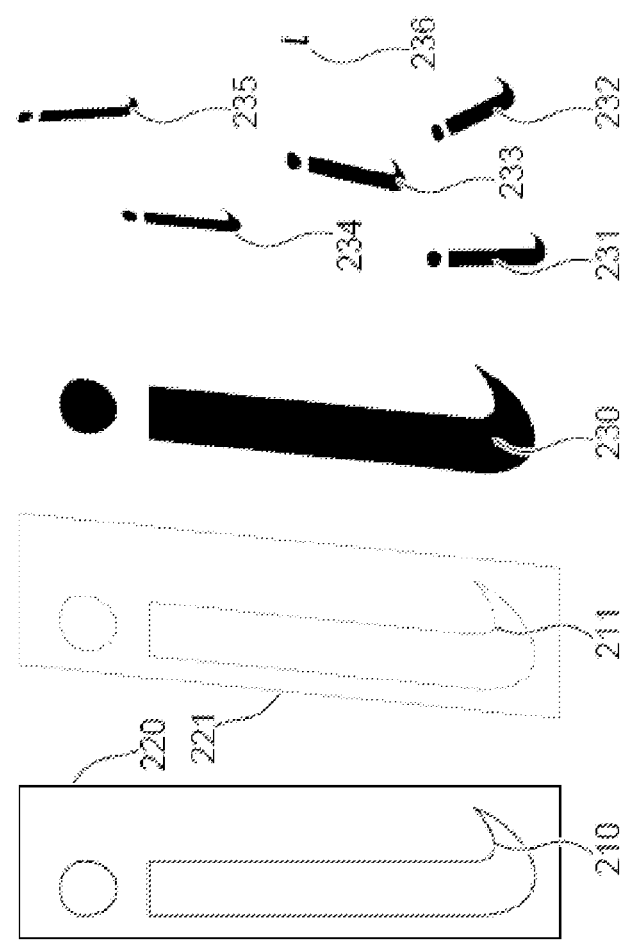

FIG. 2A illustrates an example "i" glyph. Rendering data in a bit map of a glyph may include a glyph outline 210 for the glyph as well as a corresponding bounding box 220 defined for the same glyph. Bounding boxes are useful in kerning or in spacing narrow or fat glyphs well, so that a character string "different", when rendered by corresponding glyphs, does not have an appearance with unusually spaced letters, as illustrated in FIG. 2B. Applying a common spatial transformation to the glyph outline 210 and the bounding box 220 yields, for example, a second different outline 211 and a second different bounding box 221. Slanting bounding boxes such as 221 may be used to space slanting letters better than simply abutting rectangles of bounding boxes such as 220, as in the case of "Vi", as illustrated in FIG. 2C. Filling black inside the glyph outline 211 gives rise to a visible glyph 230. Different common spatial transformations to the glyph outline 210 and the bounding box 220 may be used to produce different shapes and sizes 231, 232, 233, 234, 235 or 236 for the letter "i".

More than one way may be used to represent a mathematical, zero-width curve C; different ways of representations fall into two broad classes. First, an implicit form may be used to provide a continuous function $f(x, y)$ of positions $(x, y)$. In an example embodiment, values of $f(x, y)$ are positive for $(x, y)$ on one side of the zero-width curve C, and negative on the other side of C, so that C is the set of those positions $(x, y)$ where $$f(x,y)=0 \qquad \text{expression (1)}$$

For example, a unit circle centered at a position $(0, 0)$ is the set of those positions $(x, y)$ where $$x^2+y^2-1=0 \qquad \text{expression (2)}$$

In general a curve specified with an implicit form may be relatively difficult to draw on an empty backgrounds, as one has to find all the points satisfying expression (1) in order to render the curve C. However, the implicit form may be used to perform fill operations relatively easily. For example, a pixel centered at $(x, y)$ is inside the circle as defined by expression (2) if and only if $$x^2+y^2-1<0 \qquad \text{expression (3)}$$

which may be easily tested.

A glyph rendering rule "color a pixel black if the pixel passes expression (3)", however, produces a visually imperfect disk, as a pixel has finite non-zero spatial dimensions. The circle 301 in FIG. 3 contains pixels like 302 and excludes pixels like 303, but cuts through pixels like 310. A display device may not be able to blacken only a part, but not the whole, of a pixel, as in the image 300. If only two colors are available as in 333, each pixel is colored according to whether its center is inside. Pixels like 302 and 303 remain black and white respectively, but the pixel 310 is wholly black because its center position satisfies expression (3), while another pixel 311 is white because its center position is outside the circle 301 and fails to satisfy expression (3). Even in a smaller-scale view 350, where individual pixels are relatively hard to see, the resulting "jaggies" are conspicuous.

3. Rendering Operations in the Vicinity of a Glyph Outline

A pixel's geometry may be fixed by specific hardware or a specific glyph rendering device. Further, an individual pixel may be allowed to express only one specific color at a given time. However, there may be many colors available to be selected for a specific color of a pixel. For example, any gray level in a plurality of gray levels—including but not limited to any of, black, white and one or more intermediate gray levels between black and white—may be selected for a pixel to express. If the glyph is to be rendered in green against a blue background, gray levels are replaced by intermediates between green and blue, and similarly for other color situations.

For the purpose of illustration only, in the drawings accompanying this disclosure, different gray levels may be represented by varying sizes of black dots that represent pixels, as gray levels may not be generally included in patent drawings. Further, for the purpose of illustration only, empty circles previously used to represent white pixels may be omitted from drawings referred to in the subsequent discussion. It is noted that while current human technology uses displays with pixels of fixed size and varying color or brightness, a squid generates patterns on its skin by expanding or contracting chromatophores whose color is fixed. The current interest in biomimetics may lead to human implementation of such a display, for which the sizes of dots would more directly correspond to gray levels or colors. These techniques may be used in place of, or in addition to, techniques that make use of different colors or gray levels.

Figure 4:
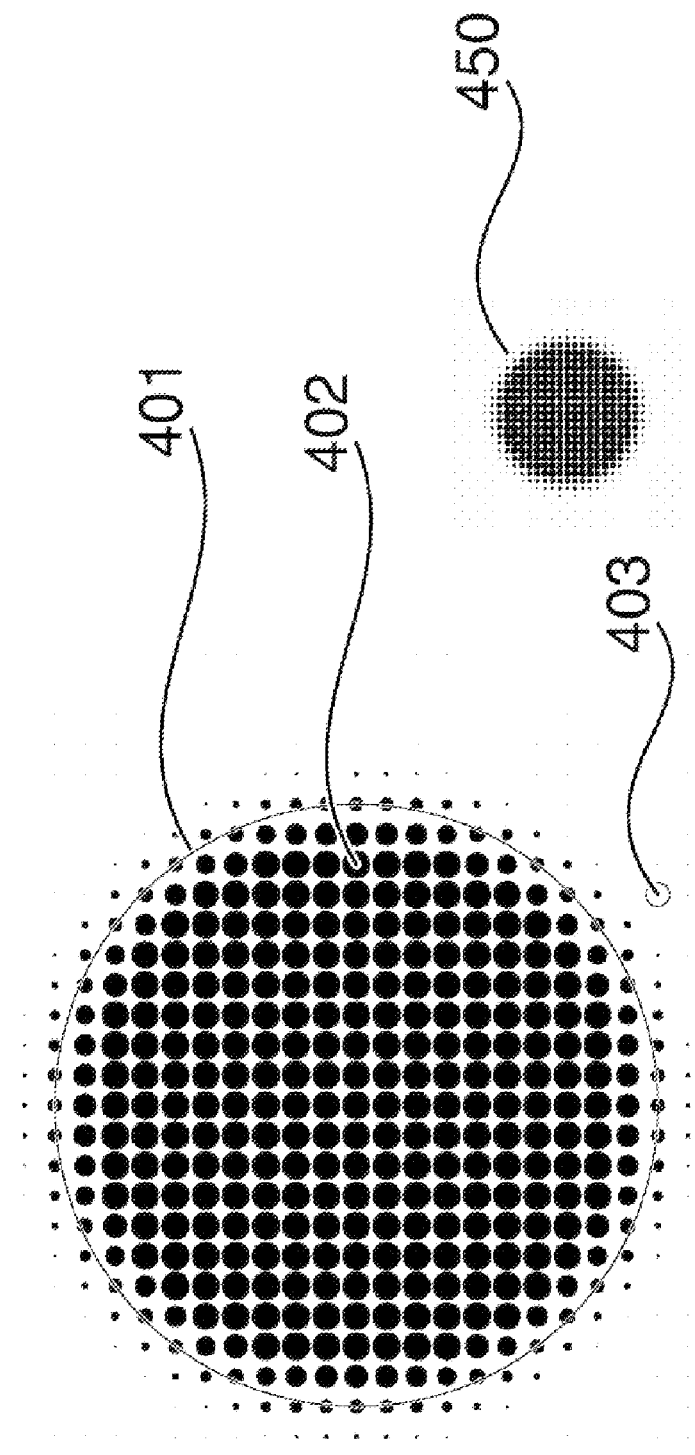
FIG. 4 illustrates anti-aliasing with a circular shape glyph.

As FIG. 4 illustrates, in an example embodiment, pixels where "$x^2+y^2-1$" is substantially negative (for example, "$x^2+y^2-1$" is below $-1;4$) may be given full size (completely black), while pixels "$x^2+y^2-1$" is substantially positive (for example, "$x^2+y^2-1$" is above ¼) may be given empty size (white); other pixels may be given intermediate sizes (to represent gray levels) between the full size and the empty size.

Figure 3:
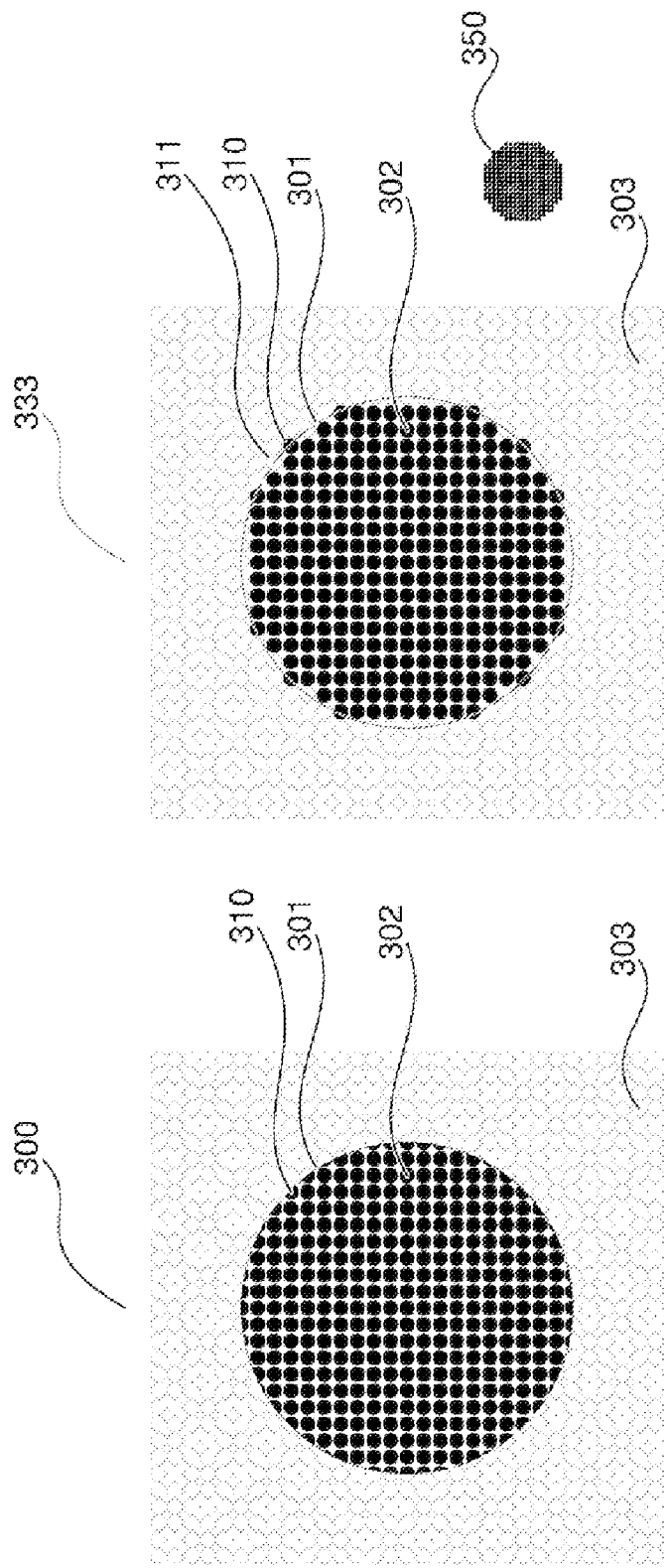
FIG. 3 illustrates aliasing with a circular shape glyph.

To human vision, a result 450 of FIG. 4 with small pixels looks far more circular than 350 of FIG. 3. The precise range (for example, -¼ or ¼ in the previous discussion) over which an anti-aliasing gradation of gray levels or color values is used may vary with implementations.

Additionally, optionally, or alternatively, the same circle as given in expression (2) may be given in a parameterized form, for example, by the following expression:

$$(x(s),y(s))=(\cos(s), \sin(s)) \qquad \text{expression (4)}$$

Each value of the parameter s in a value range from $-\pi$ to $+\pi$ gives directly a point on the circle. In an example, discretely spacing s values at $\pi/30$ apart gives rise to all the corners of a 60-gon, visually approximating (even looking identical to) a circle. A parametric form like expression (4) thus helps in drawing a curve. However, even in this simple case, it may be relatively complicated to fill pixel colors with a simple "in or out?" test. For general x(s) and y(s) functions, decision methods that assign only binary colors or binary gray levels to pixels based on a determination of which side of a curve a specific point or pixel lies on may already be laborious; it may be computationally costly to determine or assign pixel colors in relation to the curve given by general x(s) and y(s) functions. Anti-aliasing that involves assigning different colors or gray levels to pixels in the vicinity of a curve (or a glyph outline) becomes even more laborious with a parametric form as illustrated in expression (4).

4. Glyph Outline

A glyph outline may be given in a parameterized form, or a non-parameterized form. In some embodiments, one or more functions may be used to define a glyph outline, although it may be harder to find outlining functions for a letter "A" than for a dot ".".

Figure 5:
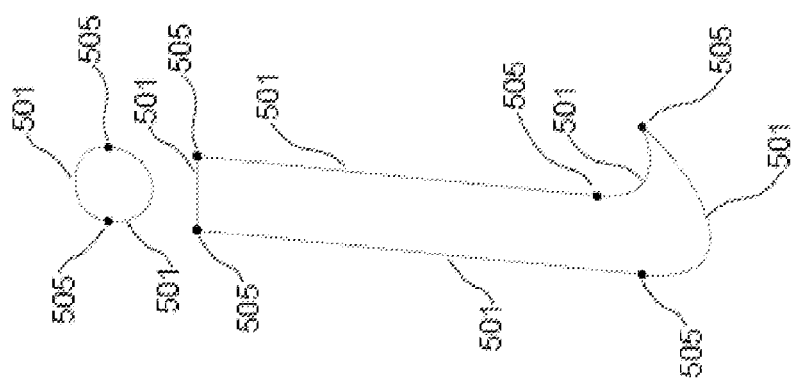
FIG. 5 illustrates a glyph outline decomposed into a plurality of segments.

In some embodiments, as an alternative to using a single formula like expression (4), a glyph outline may be decomposed into a plurality of segments, as illustrated in FIG. 5. Segments 501 in the plurality of segments that form the glyph outline may meet one another at a plurality of nodes 505. Both segments 501 and nodes 505 may be individually specified as a part of data defining the corresponding glyph outline. A segment, whether straight or not straight, may require anti-aliasing to avoid "jaggies".

A planar quadric curve may be defined by a parametric specification of points $p_s=(x(s), y(s))$ for a range of s between two end values, such as 0 and 1, with quadratic expressions as follows:

$$x(s)=A+Bs+Cs^2$$

$$y(s)=\alpha+\beta s+\gamma^2 \qquad \text{expression (5)}$$

which comprises two endpoints as follows:

$$p(0)=(x(0),y(0))=(A,\alpha) \qquad \text{expression (6)}$$

$$p(1)=(x(1),y(1))=(A+B+C,\alpha+\beta+\gamma) \qquad \text{expression (7)}$$

5. Bézier Polygon

In some embodiments, a segment of a glyph outline such as illustrated in FIG. 5 may be specified with a Bézier spline. For example, a planar Bézier quadric may be used to specify a quadric curve, not directly as in expression (5) by the coefficients A, B, C, $\alpha$, $\beta$, $\gamma$, but by the end-points $p_0=p(0)$ and $p_1=p(1)$, plus a control point $p_c=(x_c, y_c)$ not usually on the curve (for example, $p_c \neq p(s)$ for any s) unless the curve is in fact straight. A point (x, y) on the quadric curve may be specified using $p_0$, $p_1$ and $p_c$ as follows:

$$(x(s),y(s))=(1-s)^2 p_0+2s(1-s)p_c+s^2 p_1 \qquad \text{expression (8)}$$

Figure 6:
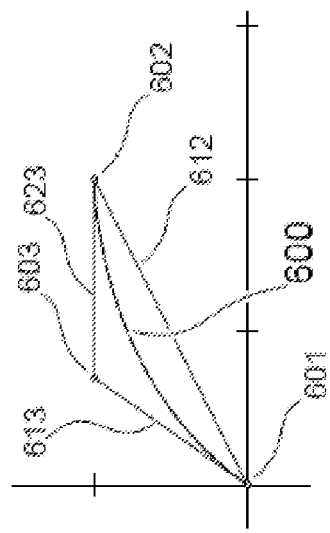
FIG. 6 illustrates a planar Bézier quadric.

FIG. 6 illustrates a planar Bézier quadric 600, in accordance with an example embodiment. Following the standard scheme, the Bézier quadric 600 may be defined by an initial point 601 given by $p_0=(0, 0)$, a final point 602 given by $p_1=(2, 1)$, and a control point 603 given by $p_c=(0.7, 1)$. Two general features of the Bézier quadric 600 may be observed:

1. bound: the Bézier quadric 600 does not leave the triangle given by the control point and two endpoints, and 2. tangency: the Bézier quadric 600 is tangent at the initial point 601 to a straight line 613 formed by 601 and the control point 603, and tangent at the final point 602 to the straight line 623 formed by 602 and the control point 603.

These features of Bézier quadrics or curves make such quadrics or curves widely used in computer graphics.

Thus, a quadric curve as specified by an expression like (5) with a number of coefficients may be alternatively represented or replaced by a Bézier quadric given by an expression like (8) with endpoints and control point, which may be specified based on the coefficients as follows:

$$p_0=(A,\alpha)$$

$$p_1=(A+B+C,\alpha+\beta+\gamma)$$

$$p_c=(A+B/2,\alpha+\beta/2) \qquad \text{expression (9)}$$

Conversely, a Bézier quadric given by an expression like (8) with endpoints and control point may be alternatively represented or replaced by a quadric curve as specified by an expression like (5) with a number of coefficients. For example, the quadric curve as given by expression (5) may be obtained based on the Bézier quadric as given by expression (8), simply by multiplying out the $(1-s)^2$ and $s(1-s)$ terms and then collecting power coefficients for like powers of s. The two representations provide the same points (x(s), y(s)) for the same value of s, but allow the use of different data structures to store relevant control data (for example, one with polynomial coefficients, while the other with control point and endpoints) in the two representations, respectively. A Bézier quadric is not simply a quadric curve, as specified by coefficients as in expression (5): it is a quadric curve together with the end and control points that specify it as in expression (8). The same quadric, stored and manipulated using coefficients as in expression (5), is not a Bézier quadric, even when derived from data originally in the Bézier format.

A planar cubic curve comprising points $p_s=(x(s),y(s))$ for s between 0 and 1 may be specified by a cubic expression as follows:

$$x(s)=A+Bs+Cs^2+Ds^3$$

$$y(s)=\alpha+\beta s+\gamma s^2+\delta s^3 \qquad \text{expression (10)}$$

which has two endpoints as follows:

$$p(0)=(x(0),y(0))=(A,\alpha) \qquad \text{expression (11)}$$

$$p(1)=(x(1),y(1))=(A+B+C+D,\alpha+\beta+\gamma+\delta) \qquad \text{expression (12)}$$

A planar Bézier cubic may be used to represent a cubic curve, and may be defined based on the endpoints $p_0=p(0)$ and $p_1=p(1)$ and two control points $p_c=(x_c, y_c)$ and $p_d=(x_d, y_d)$. The two control points $p_c$ and $p_d$ are not necessarily on the cubic curve, but by the definition of "Bézier cubic" are chosen such that:

$$(x(s),y(s))=(1-s)^3 p_0+s(1-s)^2 p_c+s^2(1-s)p_d+s^3 p_1 \qquad \text{expression (13)}$$

Figure 7:
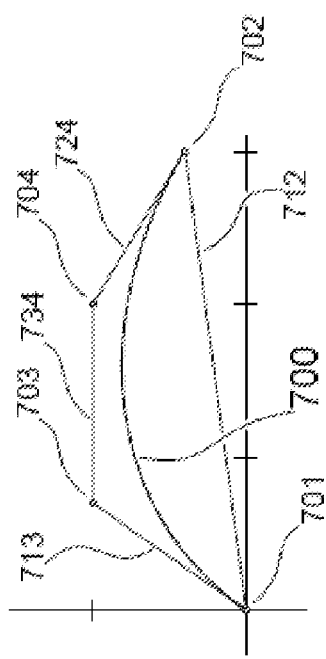
FIG. 7 illustrates a planar Bézier cubic.

FIG. 7 illustrates a planar Bézier cubic. For the purpose of illustration only, the Bézier cubic 700 may be defined by an initial point 701 given by $p_0=(0, 0)$, a final point 702 given by $p_1=(3, 0.4)$, a first control point 703 given by $p_c=(0.7, 1)$, and a second control point 704 given by $p_c=(2, 1)$. Two general features of the Bézier cubic 700 may be observed:

1. bound: the Bézier cubic 700 does not leave the quadrilateral given by the two control points and two endpoints, and 2. tangency: the Bézier cubic 700 is tangent at the initial point 701 to a straight line 713 formed by 701 and the control point 703, and tangent at the final point 702 to the straight line 724 formed by 702 and the control point 704.

As noted, these features of Bézier curves make such curves widely used in computer graphics. The triangle or quadrilateral, as illustrated in FIG. 6 and FIG. 7, which bounds a Bézier quadric or cubic curve may be referred to as a Bézier polygon.

6. Glyph Rendering with Bézier Polygons

Figure 8:
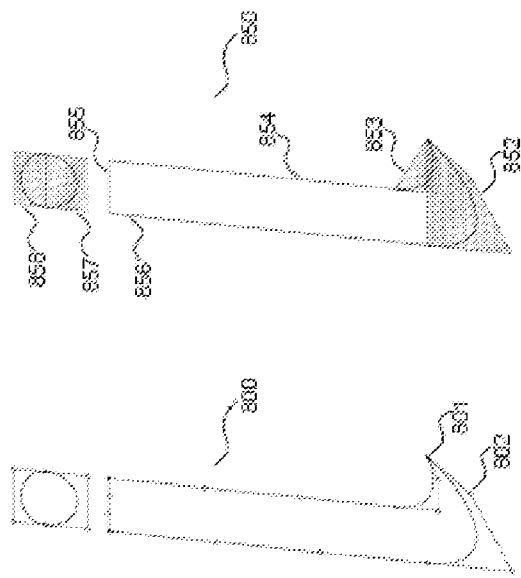
FIG. 8 illustrates a glyph outline with segments represented by Bézier curves enclosed in Bézier polygons.

FIG. 8 illustrates how a glyph outline is defined by segments (which may be those illustrated in FIG. 5) represented by Bézier curves. In FIG. 8, data for the Bézier curves (for example, cubic curves) that represent the segments of the glyph outline may form a drawing 800. Endpoints (for example, 801) of the Bézier curves are represented by solid dots at which segments join one another (the endpoints thus become the aforementioned nodes), while control points (for example, 802) of the Bézier curves are represented by hollow dots. Boxes 852, 853, 854, 855, 856, 857 and 858 in 850 illustrate the quadrilaterals formed by these endpoints and control points, including three degenerate boxes 854, 855 and 856 whose control points are in straight lines between endpoints of the degenerate boxes, respectively. As a result, the quadrilaterals formed by these control points and endpoints in the degenerate boxes reduce the degenerate box to zero width. In contrast, other (non-degenerate) quadrilaterals are represented by shaded boxes in FIG. 8.

Most glyphs in computer fonts are specified with outlines using Bézier quadrics or cubics, or a combination of the two types. In some embodiments, fonts use only Bézier quadrics. As Bézier quadrics or cubics have great importance for display operations, it may be important to fill colors in pixels around (for example, concave and convex sides of) these curves smoothly and efficiently.

Given a glyph outline like 850 of FIG. 8, a question arises as to how pixels on the two sides of the glyph outline should be filled.

Under some techniques, a glyph outline or a portion thereof may be replaced by many-small-step polygons. Techniques for filling polygons may be used in filling the glyph outline. For polygons with numerous sides, this filling operation may be expensive in both memory and computation. Under some techniques, specific geometries of Bézier curves may be used for filling.

Figure 9:
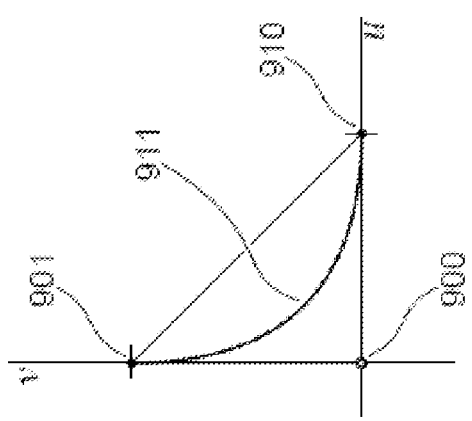
FIG. 9 illustrates a canonic form of a Bézier curve.

The control point of such a Bézier quadric may be chosen as origin. For any Bézier quadric that does not degenerate into a line, the two endpoints of the Bézier quadric may be represented as unit points along u and v axes, for example, by spatial rotation, spatial translation, redefining parameters, etc., as illustrated in FIG. 9. A suitable s parameter and/or spatial transformation may be chosen to place these points at specific locations as illustrated in FIG. 9. In these coordinates u and v, the Bézier quadric (for example, 911) is between a point (1, 0) and another point (0, 1), shown as 901 and 910 in FIG. 9, with a control point (0, 0) shown as 900. Expression (8) may be reduced to an expression as follows:

$$(u(s), v(s)) = (1-s)^2(1, 0) + 2s(1-s)$$
$$(0, 0) + s^2(0, 1)$$
$$= ((1-s)^2, s)$$

expression (14)

which gives rise to an implicit form as follows:

$$f = (u-v)^2 - 2(u+v) + 1$$

expression (15)

According to whether an outline segment (for example, as given by either expression (14) or expression (15)) is concave or convex based on the perspective of an internal part of a glyph, one of a spatial region with $f(u, v) \leq 0$ and a spatial region with $f(u, v) \geq 0$ may be filled. Any (x, y) coordinates may be easily transformed, for example, by one or more linear transformations such as spatial rotations, translations, or scaling into (u, v) coordinates, without disturbing Bézier-based filling logic. Thus, a test as to whether $f(u, v)$ is less than or greater than zero might be used as a simple, fast, pixel-by-pixel color test in some circumstances.

Similar logic, but mathematically slightly more complicated, may be used to reduce a general Bézier cubic into one of three cubic standard forms, analogous to the single quadratic standard form as given by expression (15), thereby providing a similar pixel-by-pixel color test for Bézier cubics.

Thus, filling colors relative to a glyph outline may be performed by filling a region of a Bézier polygon such as Bézier triangle or quadrilateral based on the above-discussed pixel-by-pixel color test using Bézier curves (for example, cubic or quadric curves), which represent segments of the glyph outline. By the bound property of Bézier curves, every segment of the glyph outline is contained in the Bézier curves, so for any pixel not on one of the Bézier curves, the color test is easy to perform.

However, it may happen that some, if not all, of the Bézier polygons overlap, like 852 and 853 in FIG. 8. For a pixel in more than one Bézier polygon, a question arises as to which of more than one test from the more than one overlapping Bézier polygon should apply. While this problem may be soluble, it adds to the complexity of Bézier polygon based filling techniques as discussed above.

Second, the use of Bézier polygons complicates anti-aliasing in some aspects. This may be illustrated even for a simple glyph such as a circular dot as illustrated in FIG. 3 and FIG. 4. Pixel colors in a Bézier polygon may be obtained by varying continuously with $f(u, v)$, as one may similarly do directly with $x^2+y^2-1$, as previously discussed. The Bézier polygon based filling operation (for example, with $f(u, v)$) works well for parts of a segment that are deeply inside a corresponding Bézier polygon, but often works badly at the ends of the segment at which the width of the Bézier polygon vanishes.

Figure 10:
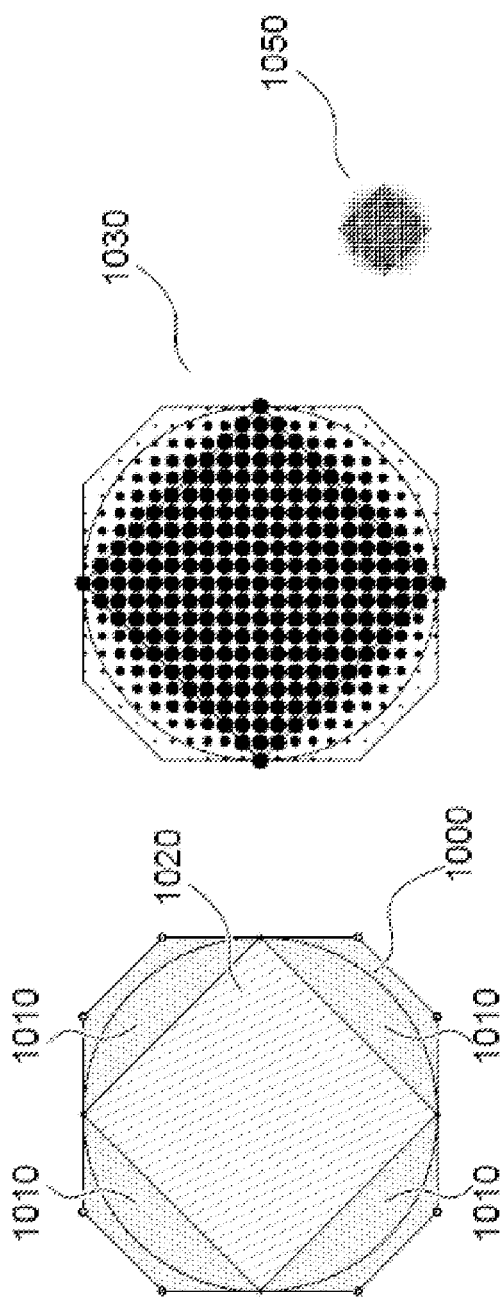
FIG. 10 illustrates a circle excellently approximated by four Bézier cubics with prominent aliasing artifacts.

As illustrated in FIG. 10, a circle 1000 is excellently approximated by four Bézier cubics, with the ends and control points as shown. Within four Bézier polygons 1010, the pixel-by-pixel color test based on the Bézier cubics may be applied. If anti-aliasing similar to that illustrated in FIG. 4 is applied to the Bézier cubics here, then in a fully-inside region 1020 all pixels will be colored fully black, and in fully-outside regions pixels will be colored fully white. Other pixels may be given varying gray levels. A resultant rendering 1030 of the glyph is that the leftmost and rightmost gray pixels in FIG. 4 are instead colored white in FIG. 10, while pixels near or at the segment ends (whose closeness to the boundary decides their gray levels) may fall in the fully-inside region 1020 and be colored fully black. With construction lines removed, and scaled for a smaller-pixel view, a resultant rendering 1050 of the glyph is not the smooth roundness of 450 of FIG. 4, but instead takes on a more strikingly wrong look than the original jagged 350 of FIG. 3.

By the tangency property of Bézier curves as noted above, pixels near endpoints of the Bézier curves come too close to the sides and corners of corresponding Bézier polygons. Even though points on the Bézier curves may be (barely for the endpoints) by the bound property of the Bézier curve contained in the corresponding Bézier polygons, respectively, anti-aliasing may not be well performed for these pixels near the endpoints if such anti-aliasing is limited to their respective Bézier polygons. To perform anti-aliasing for these pixels properly, an anti-aliasing operation will need to be extended in the surrounding Bézier polygons, thereby adding a layer of complexity to, and limiting the effectiveness and efficiency of, the pixel-by-pixel color tests based on individual Bézier polygons. This might even result in poor glyph rendering based on Bézier curves.

The problem of overlapping Bézier polygons may be worse if a glyph outline comprises near-straight segments. In some embodiments, exactly straight segments, if they are identified as such, for example, in glyph rendering data, may be handled separately from other segments. For example, in a uniformly-cubic representation for segments, straightness may be produced by placing control points on a straight line. However, numerical rounding (for example, when computing numeric values from a smooth zero-width Bézier curve or line into quantized integer, fixed point, floating point, or double values), which affects the determination as to whether a segment is exactly straight, often makes this placement of control point on a straight line imperfect.

Figure 11B:
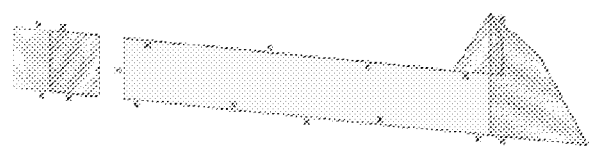
FIG. 11A and FIG. 11B illustrate limitations of glyph rendering with Bézier polygons.
Figure 11A:
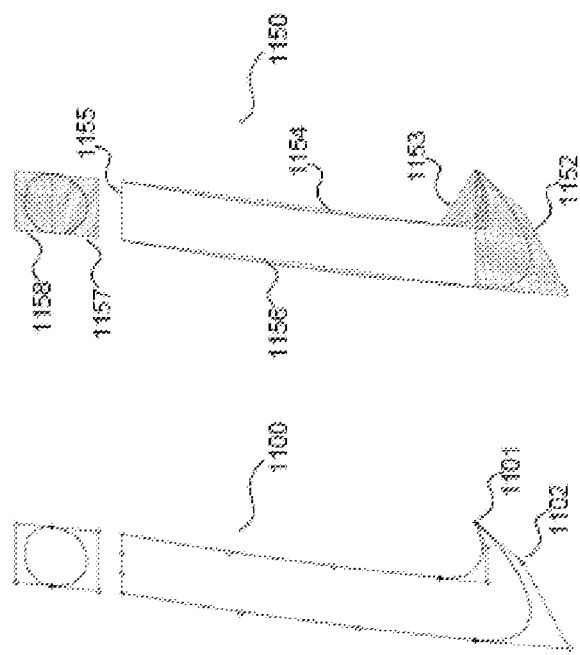

Alternatively, straightness of a segment may be detected for special treatment if all positions of the segment satisfy a 'within $\epsilon$ of degeneracy' test, wherein $\epsilon$ defines a maximum for the positions to deviate from a straight line. However, too large a value of $\epsilon$ would allow slightly curved segments as illustrated in FIG. 11A to pass as straight lines, and hence to inappropriately receive straight-segment handling. Too small a value of $\epsilon$ would miss segments that should be treated as straight. Further, a transformation that transforms a long thin triangle into the standard Bézier form as illustrated in FIG. 9 may be close to becoming singular, risking significant numerical errors.

If anti-aliasing is to be restricted to Bézier polygons around segments, then for the thin boxes 854, 856 (of FIG. 8), 1154 and 1156 (of FIG. 11A), anti-aliasing will be performed within long stretches given by these thin boxes. Since 'fully-inside' and 'fully-outside' polygons within these long stretches come so close to being a common thin line, anti-aliasing will be insufficiently performed for the segments enclosed in these Bézier polygons. Hence, "jaggies" reappear.

Other problems exist for some techniques (for example, the Loop-Blinn method as described in the U.S. Pat. No. 7,564, 459). For example, as illustrated in FIG. 11B, many points or pixels (for example, cross-marked in FIG. 4) near a glyph outline that should be treated with anti-aliasing or drop-shadow operations are in none of Bézier polygons created by the Loop-Blinn method. These points include ones located near straight line segments of the glyph outline that are associated with Bézier polygons that are too narrow to include the cross-marked points. These points also include ones (for example, cross-marked in FIG. 11B) located near endpoints, even some interior points of Bézier curves. As a result, visible artifacts may be produced by these methods without adding a layer of complicity to deal with these problems.

When a glyph is rendered with only a few pixels cross, additional problems occur for some techniques such as the Loop-Blinn method. For example, a glyph for the letter "b" may comprise a completely encircled white interior, while a glyph for the letter "h" may comprise a white area that is not completely encircled at the bottom. When these glyphs are rendered by the Loop-Blinn method, differences in topologies of these glyphs such as a completely encircled white interior versus a non-closed white area may be destroyed in the process, rendering these glyphs indistinguishable from each other.

In sharp contrast, these problems (for example, associated with the Loop-Blinn method) may be avoided under techniques as described herein, which recognize that the interior region (or figure inside a glyph outline) of a glyph and the exterior region (or ground outside the glyph outline but inside a bounding box) of the glyph are both important.

7. Skeleton Construction

In an embodiment, to capture a glyph's topology, skeleta for the glyph may be constructed. The skeleta comprise both a skeleton within the figure of the glyph and a skeleton within the ground of the glyph. The skeleta may be constructed in one or more of a variety of different ways. Examples of constructing skeleta include, but are not limited only to any of, using morphological operators, using supplementing morphological operators with shape based pruning, using curve evolution, using level sets, using curve evolution, finding ridge points on the distance function, peeling a shape (without changing its topology) until convergence, using xelular sets, or using other skeleton finding methods/algorithms.

FIG. 13A illustrates polygonal skeleta of a glyph (1300 of FIG. 13B), which comprise a first polygonal skeleton (1311 of FIG. 13B) for the interior region of the glyph and a second polygonal skeleton (1312 of FIG. 13B) for the exterior region (or background region) of the glyph in a bounding box (1301 of FIG. 13B), in accordance with an example embodiment. The first polygonal skeleton (1311 of FIG. 13B) or the second polygonal skeleton (1312 of FIG. 13B) may be decomposed into a plurality of skeleton segments endpoints of which are skeleton nodes, which are depicted as hollow circles in FIG. 13B.

For the purpose of clarifying terminologies, the terms "segments" and "nodes" not preceded by the word "skeleton" may refer to segments and nodes of a glyph outline, respectively, while the terms "skeleton segments" and "skeleton nodes" may refer to parts or components of a skeleton.

In some embodiments, skeleton segments of a skeleton may be represented with line segments between skeleton nodes, while segments of a glyph outline may be represented with line segments, quadratic curves, cubic curves, or other types of curve functions. For example, skeleta of a glyph as described herein may comprise polygonal skeletons. A polygonal skeleton comprises multiple line segments that are joined at skeleton nodes.

Figure 14:
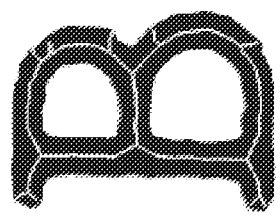
FIG. 14 illustrates a pixel-by-pixel skeleton from which a polygonal skeleton may be built.

One or more of various skeleton finding processes, including but not limited only to any of, those based on wave propagation, may be used to construct a polygonal skeleton (1311 or 1312 of FIG. 13B). If a particular skeleton algorithm yields an overly detailed structure for a skeleton such as a pixel-by-pixel skeleton, as in FIG. 14, a new set of skeleton nodes and skeleton segments at a coarser spatial resolution than that of the overly detailed structure may be generated as a skeleton to approximate the detailed structure. For example, endpoints and branch-off points on a skeleton may be selected as skeleton nodes. A set of connecting segments may be determined based on the graph formed by the overly detailed structure. These segments may be straightened out to become linear skeleton segments. If any linear skeleton segment is too close the glyph outline or even crosses the glyph outline, then one or more intermediate points on the original curved segment that gives rise to that linear segment may be selected to obtain two or more linear skeleton segments to replace the linear skeleton segment. In some embodiments, short branches from the overly detailed structure may be ignored or removed from a polygonal skeleton as described herein. More skeleton nodes may be assigned to more curved regions (which may be located in either the interior or the exterior region) of a glyph. As a result, a pair of skeleta comprising a polygonal skeleton (for example, 1311 of FIG. 13B) for the interior region (or figure) of a glyph and another polygonal skeleton (for example, 1312 of FIG. 13B) for the exterior region (or background region or ground) of the glyph in a bounding box may be generated, as illustrated in FIG. 13A.

A complete skeleton finding process may be computationally costly, though the present invention is compatible with any skeletonization process, including inexpensive ones existing or yet to be discovered. In some embodiments, such a process may not be repeated each time when a glyph is displayed; for example, skeleton data as determined by a previously run skeleton finding process may be saved, in an exemplary embodiment stored with the font data, and reused.

In such embodiments, skeleton extraction or skeleton finding is performed once per glyph. The skeleton information as thereby determined may be used at least in part to derive a polygon mesh, as will be further explained. For example, a triangular mesh may be used. The data specifying the polygon mesh may be stored as glyph data for fast rendering at runtime. The repetition of skeleton finding may be avoided at the runtime. In an embodiment, data for a triangular mesh for a glyph as determined based at least in part on a skeleton finding process may be stored along with corresponding algebraic coefficients in font data for the glyph, for example, at system or software installation time. The font data including but not limited to the data for the triangular mesh may be used at runtime to facilitate fast anti-aliasing and glyph rendering operations. In some embodiments, the font data includes polygon mesh data derived in part from skeleton data as determined by a skeleton finding process, but may not include the skeleton data itself.

8. Transepts

Figure 16:
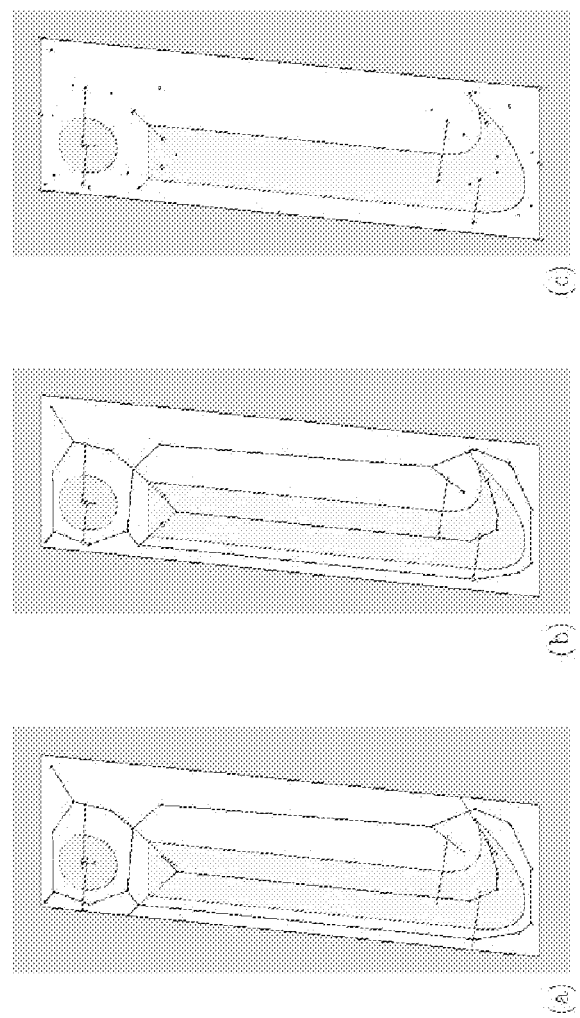
FIG. 16($a$), FIG. 16($b$) and FIG. 16($c$) illustrate skeletons, transepts and candidate tessellation vertices.

Embodiments include defining or generating transepts at nodes on a glyph outline. FIG. 16(*a*) illustrates a plurality of transepts at and through a plurality of nodes on an example glyph outline, which may be denoted as G. In some embodiments, as shown in FIG. 16(*a*), if the tangent to the glyph outline is directionally continuous at a specific node on the glyph outline, then a transept may be defined or generated at the specific node as a line that is normal or perpendicular to the tangent of the glyph outline at the specific node. In some embodiments, if the glyph outline is directionally discontinuous (turning through a non-zero angle) at a specific node on the glyph outline, then a transept may be defined or generated at the specific node as a line that bisects the angle formed by two discontinuous tangent directions of the glyph outline. Other ways of generating transepts that substantially bisects an angle or transversely passes through a segment of a glyph may be used in various possible embodiments.

Figure 12:
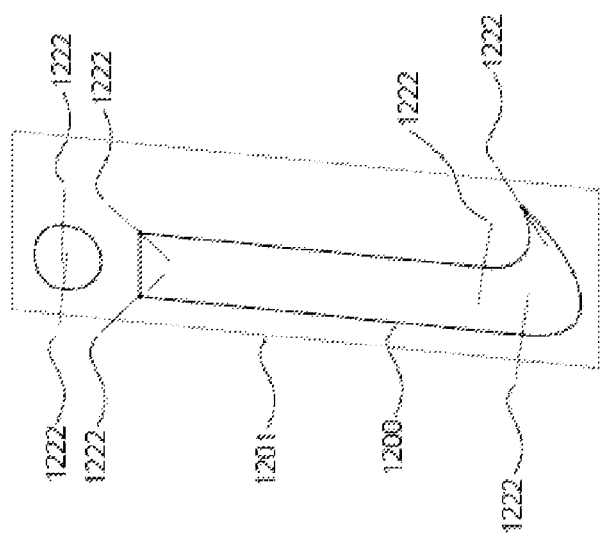
FIG. 12 illustrates transepts in a bounding box of a glyph.

FIG. 12 further illustrates transepts 1222 in a bounding box 1201, for example, 220 or 221 of FIG. 2, that contain segments, for example, 501 of FIG. 5, of a glyph, in accordance with an example embodiment. As illustrated, each of transepts 1222 is constructed at a node at which two segments of a glyph outline 1200 join each other. When two segments, for example, 505 of FIG. 5, meet at a node, for example, 505 of FIG. 5, with a common direction (for example, at least first-order continuous), a transept is defined as the geometrically normal line at the node to the common direction. When two segments, for example, 505 of FIG. 5, meet at a node, for example, 505 of FIG. 5, with two different directions (for example, only zero-order continuous), a transept is defined as the geometrically a compromise direction at the node, which may be, for example, the bisector of an angle formed by the two different directions.

9. Tessellation

Figure 15B:
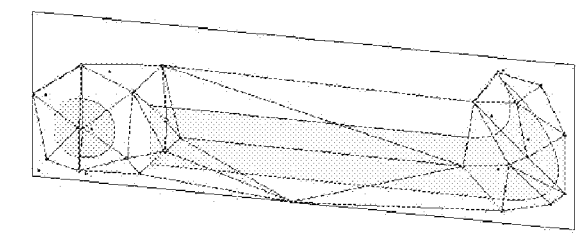
FIG. 15A and FIG. 15B illustrate polygon meshes.
Figure 15A:
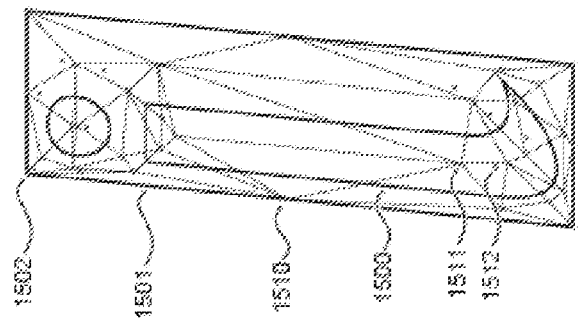

Using skeleta and transepts constructed for a glyph, the interior region of a bounding box 1201 of the glyph (for example, for a letter "i") may be divided into, or covered with, a polygon mesh as shown in FIG. 15A through tessellation. Tessellation may, but is not limited only to, be based on a constrained Delaunay triangulation, which is constrained to use as vertices the transept ends and the bounding box corners, and permitted to use as vertices the skeleton nodes. In some embodiments, a polygon mesh comprises tessellation polygons. A tessellation polygon may be formed based on three or more tessellation vertices. In some embodiments, such a tessellation polygon is a convex hull of the three or more tessellation vertices.

Vertices of a polygon mesh may be selected from a list of candidate vertices. The list of candidate vertices for tessellation may include, but are not limited only to any of, skeleton nodes and/or termination points of transepts. Termination points of a transept must be located on both sides of a node of a glyph outline at which the transept is defined or generated. In some embodiments, for a transept T through or at a node N of a glyph outline, one or more intersections between the transept T and skeleton segments may be determined. Additionally, optionally, or alternatively, points on the transept T of close approach to skeleton nodes may be determined. In some embodiments, the nearest of the intersections or points of close approach to the node N of the glyph outline in each of the two opposite direction along the transept T are identified. As a result, a plurality of termination points on the transepts may be identified within the bounding box of the glyph, as illustrated in FIG. 16(b). At these termination points of transepts, the transepts either meet or approach skeleta in the figure and ground of the glyph. In some embodiments, termination points on the transepts along with skeleton nodes may be added to the list of candidate vertices for tessellation. FIG. 16(c) illustrates candidate vertices comprising skeleton nodes identified from polygon skeletons and termination points identified from transepts.

FIG. 15A illustrates a triangular mesh that covers a bounding box 1501 of a glyph. As discussed above, vertices of the triangular mesh of FIG. 15A may be at least in part selected from the list of candidate points including termination points of transepts and a plurality of skeleton nodes 1511. In some embodiments, the vertices of the triangular mesh further include the corner points 1502 of the bounding box 1501. In some embodiments, the vertices of the triangular mesh further include selected points 1510 on the sides of the bounding box 1501.

The selected points 1510 as illustrated in FIG. 15A may be chosen from points, for example, mid-points, on the sides of the bounding box 1501. The selected points 1510 may include, but are not limited only to any of, different types of intermediate points (for example, ⅓ of the length of a side away from a corner of the bounding box 1501) on the sides of the bounding box 1501. A method used for tessellation as described herein may also omit one or more of skeleton nodes 1512 found by a skeleton finding process. For example, one or more ground-only triangles outside the glyph figure may be omitted to generate an alternative triangle mesh as illustrated in FIG. 15B.

In some embodiments, transepts, for example, 1222 of FIG. 12, may be arranged to form sides of one or more tessellation polygons that contain segments of a glyph outline. In some embodiments, the segments of the glyph outline do not meet sides of the tessellation polygons tangentially and further do not located at corners of the tessellation polygons. Rather, tessellation of a bounding box of a glyph may be done in such a way that each triangle or polygon is crossed by at most one segment of a glyph outline of the glyph. In some embodiments, a segment of the glyph outline goes between reasonably central edge points, and enters a triangle or polygon transversely. Thus, in some embodiments, anti-aliasing-unfriendly cross-marked points in FIG. 11B may be avoided.

Embodiments include using various means to construct a polygon mesh comprising a plurality of tessellation polygons. In an example, at least some of the tessellation polygons containing segments of a glyph may be of non-triangular shapes. In another example, all of the tessellation polygons may be of triangular shapes.

Under techniques as described herein, tessellation vertices—for example, skeleton nodes 1511, corner points 1502, candidate points on transepts, selected points 1510 on the sides of a bounding box as illustrated in FIG. 15A—are not nodes or Bézier line or curve endpoints or points on a glyph outline. Thus, unlike other techniques that use vertices located on a glyph outline near which anti-aliasing is performed, tessellation polygons such as triangles as described herein comprise vertices that are located a distance away from the glyph outline—for example, near skeletons or intersections between transepts and skeletons or points on transepts of close approach to skeleton nodes. As a result, the tessellation polygons generated under techniques as described herein provide a much better 'neighborhood' of the glyph outline for glyph operations performed near the glyph outline such as anti-aliasing or drop-shadow operations. Combining all neighborhoods of tessellation polygons that the glyph outline passes through, a strip with a sufficient non-zero width for anti-aliasing or drop-shadow operations may be found on both sides of every segment of the glyph outline in each of those neighborhoods of tessellation polygons.

Techniques as described herein may be used to prevent premature cutting-off of anti-aliasing operations that frequently occurs in other techniques. As previously noted, under other techniques, which for example use Bézier polygons and control points, points or pixels needed to be treated by anti-aliasing may be located outside all constructed Bézier polygons, especially where graceful glyph rendering is most needed. Under these other techniques, it is difficult and complicated to treat these outside pixels properly for anti-aliasing.

In sharp contrast, under techniques as described herein, since each tessellation polygon provides a strip or neighborhood with a sufficient non-zero width for anti-aliasing or drop-shadow operations, each tessellation polygon such as a triangle may safely and individually support glyph rendering operations that assign colors to foreground, background, transparent, etc., based on proximity of pixels to a glyph outline. Complications as illustrated in FIG. 11B under other techniques—for example, pixels near a glyph segment that need anti-aliasing or drop-shadow operations may not be in a Bézier polygon—may be avoided under techniques as described herein.

As described herein, tessellation polygons (for example, triangles) that contain segments of a glyph may be arranged to be non-overlapping with one another. This is in sharp contrast to Bézier polygons constructed under other techniques as illustrated in FIG. 8, which are frequently overlapping with one another. Using non-overlapping tessellation polygons under techniques as described herein improves readability and reduces adverse impact on glyph rendering operations such as anti-aliasing or drop-shadow around the glyph outline, especially when a glyph is of a small size or comprises slanting segments or is rendered at a low spatial resolution.

10. Glyph Rendering with Polygon Mesh

In some embodiments, using Bézier polygons for one or more types of glyph rendering such as anti-aliasing or drop-shadow may be avoided. Instead, curves and segments of a glyph outline may be treated as plain quadrics and cubics; non-overlapping tessellation polygons which hold the plain quadrics and cubics are directly constructed by tessellation with margins larger than what are needed for anti-aliasing. As the tessellation polygons are non-overlapping and provide margins greater than what are needed for anti-aliasing, special treatments including using brute force approaches of certain pixels—required by overlapping Bézier polygons, long narrow straight segments, and points missed by Bézier polygons—are avoided.

In some embodiments, Bézier data such as endpoints and control points and related operations that reparameterize plain or cubic curves as given in expression (5) or (10) into a standard Bézier form of FIG. 9 need not to be used; instead, assigning colors to pixels near a glyph outline under techniques as described herein may be done with implicit forms derived from the plain quadric or cubic curves as given in expression (5) or (10) without using Bézier endpoints and control points. Further, implicit forms in x and y coordinates may be transformed into display coordinates i and j for glyph rendering. Here, the display coordinates i and j may be used to column and row indices of pixels, respectively; specifically, the index i may represent a horizontal row index of an image rendering area and j may represent a column index in a row of the image rendering area. The transformation from x and y coordinates to column and row indices i and j under techniques as described herein are less prone to becoming degenerate or singular than the normalization of a Bézier segment enclosed in a thin Bézier polygon into the standard Bézier form of FIG. 9 under other techniques. In some embodiments, even if segments of a glyph outline are initially represented as Bézier curves (defined with Bézier endpoints and control points), a transformation may be made to convert the Bézier curves into plain or cubic curves as given in expression (5) or (10).

For a curve or segment of a glyph outline enclosed within a tessellation polygon (for example, a triangle for the purpose of illustration only) in a polygon mesh, an implicit form $f(x, y)=0$ may be constructed from lines, plain quadrics or cubic curves (for example, as given in expression (5) or (10)), or other types of curve, without using Bézier endpoints and control points. The implicit form in the tessellation triangle is able to extend usefully to both sides of the segment of the glyph outline. In an embodiment, the term "useful" refers to that a tessellation polygon as described herein comprises a neighborhood on both sides of the segment of the glyph outline that is able to support an implicit form based proximity test that does not require looking into other triangles in the polygon mesh; further, the implicit form based proximity test in the triangle does not conflict with proximity tests performed in the other triangles.

In some embodiments, only one implicit form $f(x, y)$ needs to be applied to any specific polygon in the polygon mesh. Each such implicit form $f(x, y)$ may provide support in a corresponding tessellation polygon for proximity test based glyph rendering operations. Thus, techniques as described herein are parallelism-friendly, invulnerable to unexpected special cases, and inherently fast, in comparison with other techniques. Proximity test based glyph rendering operations as described herein may include, but are not limited only to any of, those related to anti-aliasing or drop-shadow.

11. Implicit Forms

Under techniques as described herein, implicit forms (for example, their zero or non-zero values for points (x, y) in a tessellation polygon) may be used in proximity tests to provide a measure of signed distance from points (x, y) to segments of glyph outlines as represented by zero values of the implicit forms. A signed distance comprises a sign to indicate which side of a segment of a glyph outline a pixel or point may be in and a magnitude to indicate a spatial distance between the pixel or point and the segment of the glyph outline. Thus, a signed distance or a measure thereof may be used by glyph rendering operations to determine whether a specific point is in the interior or exterior of a glyph figure, and how deep or far it is from the near part of the boundary, and to assign various colors accordingly.

While implicit forms for straight, quadratic and cubic segments are to be illustrated, other types of implicit forms for straight, quadratic and cubic segments and/or other types of segments may be used by various embodiments.

For a straight segment of a glyph outline, between points (A, B) and (a, b), an implicit form may be defined as an affine function as follows:

$$f(x, y) = px + qy - c \qquad \text{expression (17)}$$
$$= (B - b)x + (a - A)y - (aB - Ab)$$

The points at which this implicit form $f(x, y)$ equals zero provide a straight line S between points (A, B) and (a, b). When the implicit form $f(x, y)$ does not equal to zero, it provides a measure that may or may not be precisely a signed distance from the straight line S, but is proportional to the signed distance between a point (x, y) and the straight line S. A significant property of this implicit form is that the greater the distance between the points (A, B) and (a, b) is, the smaller the signed distance of the point (x, y) to the straight line S is relative to the value given by the implicit form $f(x, y)$. The sign of $f(x, y)$ corresponds to whether (x, y) is inside or outside the glyph boundary, provided (x, y) is inside a polygon containing no other segment of the glyph boundary than S.

For a quadratic curve Q which may represent a segment of an outline glyph, parameterized expression (5) may be rewritten in a matrix form as follows:

$$\begin{bmatrix} x \\ y \end{bmatrix} = \begin{bmatrix} A \\ \alpha \end{bmatrix} + \begin{bmatrix} Bs + Cs^2 \\ \beta s + \gamma s^2 \end{bmatrix} \qquad \text{expression (18)}$$

Expression (18) may be further rewritten as follows $$\begin{bmatrix} x - A \\ y - \alpha \end{bmatrix} = \begin{bmatrix} B & C \\ \beta & \gamma \end{bmatrix} \begin{bmatrix} s \\ s^2 \end{bmatrix} \qquad \text{expression (19)}$$

The parameter terms s and $s^2$ in expression (19) may be treated as unknowns $s_1$ and $s_2$, respectively. Thus, based on expression (19), a solution for these unknowns $s_1$ and $s_2$ may be given as follows:

$$\begin{bmatrix} s_1 \\ s_2 \end{bmatrix} = \frac{1}{B\gamma - C\beta} \begin{bmatrix} \gamma & -C \\ -\beta & B \end{bmatrix} \begin{bmatrix} x - A \\ y - \alpha \end{bmatrix} \qquad \text{expression (20)}$$

This solution becomes undefined (indeed, a solution may not exist) when the determinant Bβ–Cβ of the right-hand-side 252 matrix in expression (19) equals zero, and numerically unstable as the determinant approaches zero. In some embodiments, if the determinant Bγ–Cβ is 0 or near zero (for example, within a small positive near-zero value ε, where ε is configurable), expression (18) may be deemed as describing a degenerate quadratic curve, and the quadric Q may be replaced with an explicit straight line (and henceforth be treated by expression (17) for a straight line).

However, if the determinant Bγ–Cβ is not near zero (for example, outside of a range of a small positive near-zero value ε, where ε is configurable), the solution in expression (20) is deemed well-defined. An implicit form may be properly defined for the quadratic curve Q as follows:

$$f(x,y) = s_2 - (s_1)^2 \qquad \text{expression (21)}$$

where $s_2$ and $s_1$ are individually given in expression (20).

A point (x, y) is on the quadratic curve Q exactly when the implicit form $f(x, y)$ is equal to zero at that point. Non-zero values of the implicit form $f(x, y)$ may be used as a measure of signed distance from a point (x, y) to the quadratic curve Q. In some embodiments, instead of using the illustrated parameter s that goes from 0 to 1, a different parameter and/or a different value range for the parameter, for example, from 1 to 2, may be used to reparameterize a plain quadratic curve. The sign of $f(x, y)$ in expression (21) corresponds to whether (x, y) is inside or outside the glyph boundary, provided (x, y) is inside a polygon containing no other segment of the glyph boundary than Q.

For a cubic curve K which may represent a segment of a glyph outline, a parameterized expression (10) may be used as a representation for the cubic curve K and optionally rewritten as follows:

$$0 = (A - x) + Bs + Cs^2 + Ds^3$$

$$0 = (\alpha - y) + \beta s + \gamma s^2 + \delta s^3 \qquad \text{expression (22)}$$

This is equivalent to $$0 = (\delta(A - x) - D(\alpha - y)) + (\delta B - \beta D)s + \qquad \text{expression (23)}$$
$$(\delta C - \gamma D)s^2$$
$$= Ps^2 + Qs + (R - \delta x + Dy)$$

$$0 = \delta s^3 + \gamma s^2 + \beta s + (\alpha - y) \qquad \text{expression (24)}$$

where P=(δC−γD), Q=(δB−βD), and R=(δA−Dα).

Solving these equations for a solution $s=s_1$ is equivalent to asking whether expressions (23) and (24) share a factor $(s-s_1)$. For P≠0≠δ, this holds true if the determinant in the following expression is 0:

$$f(x, y) = \qquad \text{expression (25)}$$

$$\begin{Vmatrix} P & Q & (R - \delta x + Dy) & 0 & 0 \\ 0 & P & Q & (R - \delta x + Dy) & 0 \\ 0 & 0 & P & Q & (R - \delta x + Dy) \\ \delta & \gamma & \beta & (\alpha - y) & 0 \\ 0 & \delta & \gamma & \beta & (\alpha - y) \end{Vmatrix}$$

The determinant defined by expression (25) may be used as the implicit form for the cubic curve K. Since each term in the determinant takes one factor from one column, a cubic expression in x and y may be found for the implicit form $f(x, y)$, with coefficients of the cubic expression here fixed by coefficients of the parameterized cubic curve K as defined in expression (10). The sign of $f(x, y)$ in expression (21) corresponds to whether (x, y) is inside or outside the glyph boundary, provided (x, y) is inside a polygon containing no other segment of the glyph boundary than K.

Alternatively, if P is equal to 0, expression (23) may be reduced to a linear form; consequently, an implicit form as defined in expression (17) may be used by techniques as described herein. Alternatively, if δ is equal to 0, expression (24) may be reduced to a quadratic equation, which may represent a proper quadratic curve, or may alternatively be further reduced to a straight line; consequently, either an implicit form as defined in expression (21) or (17) may be used by techniques as described herein.

12. Normalisation

In some embodiments, an implicit form is determined or generated for each segment of a glyph outline. Thus, a plurality of implicit forms in determined or generated for a plurality of polygons or triangles in a polygon mesh. An implicit form is defined or linked to exactly one $f(x, y)$ in each tessellation polygon in the plurality of polygons or triangle. An implicit form as defined by $f(x, y)$ may be used in rendering pixels within a corresponding tessellation polygon.

However, implicit forms such as defined in expressions (17), (21) and (25) in different tessellation polygons may not be uniformly proportional to signed distances of points (x, y) from a glyph outline. For example, values of an implicit form $f(x, y)$ with a first set of coefficients of expression (21) may be approximately proportional to signed distances of points (x, y) to a first (quadratic) segment of the glyph outline by a first scaling factor, while values of an implicit form $f(x, y)$ with a second set of coefficients of expression (21) may be approximately proportional to signed distances of points (x, y) to a second quadratic segment of the glyph outline by a second different scaling factor. This non-uniformity also may exist for implicit forms associated with straight lines, cubic curves, or other types of curves used to represent segments of a glyph outline. Particularly, non-uniformity of values of implicit forms also may exist between different types of curves or lines that represent different segments of a glyph outline.

In some embodiments, non-uniformity of values of different implicit forms, if untreated, may affect glyph rendering to some extent, especially at nodes of a glyph outline where segments or corresponding tessellation polygons of a glyph outline meet one another. In some embodiments, an implicit form $f(x, y)$ whose zero values give rise to a segment of a glyph outline may be treated with a normalization in which a non-normalized $f(x, y)$ may be divided by the magnitude of a gradient at a representative point on the segment of the glyph outline. At the same stage the implicit form $f(x, y)$ may be multiplied if necessary by −1, to arrange that for $(x, y)$ inside the current polygon a positive sign for $f(x, y)$ implies that $(x, y)$ is outside the glyph boundary. Here, a representative point may, but is not limited only to, be selected from an interior point on the segment such as an endpoint, a midpoint, a point corresponding to a fraction of a linear length of the segment from one of the endpoints, or another interior point. In some embodiments, two or more magnitudes of two or more gradients related to a segment of a glyph outline may be used to determine a dividing factor for an implicit form. The dividing factor may be based on, for example, an average, median, minimum or maximum of the two or more magnitudes of gradients. As a result, values of normalized implicit forms may agree with, or substantially agree with, signed distances. Substantial agreement may comprise, in an embodiment, within a small percentile such as 3%, 5%, 10%, or another percentile value. This allows agreement or substantial agreement between values of normalized implicit forms between two or more different tessellation polygons including neighboring tessellation polygons. Thus, techniques as described herein may be used to support glyph rendering operations such as anti-aliasing and drop-shadow operations in a consistent manner.

In some embodiments, scaling of an implicit form, which may or may not be normalized, may be used to control the behaviors of one or more specific glyph rendering operations. Such a glyph rendering operation may use values of the implicit form to determine whether a specific point should be assigned a certain color value in a plurality of possible color values. For example, for anti-aliasing operations, if a large number of pixels are available for glyph rendering, then scaling of an implicit form may be done in such a way that a proportionally large number of pixels are regarded as close enough in proximity to a glyph outline to receive anti-aliasing treatments. On the other hand, if only a few pixels are available, then scaling of an implicit form may be done in such a way that a proportionally few pixels are regarded as close enough in proximity to a glyph outline to receive anti-aliasing treatments. Particularly, if the glyph is being rendered across just a few pixels (for example, three pixels), topology (for example, a white region between two black regions) of the glyph becomes more important than perceived smoothness in glyph rendering. Under techniques as described herein, scaling of an implicit form may be adjusted to produce values that place fewer or no pixels near a glyph outline for anti-aliasing adjustment. As rendered pixels receive less anti-aliasing adjustment, topological information such as important dots, connections and breaks of a glyph figure may be much more apt to remain perceptible under techniques as described herein than under other techniques.

13. Rasterisation

A function in x and y coordinates may be rasterized using display coordinates i and j. In an example, a tessellation polygon may be a triangle that is associated with a quadratic function in x and y coordinates. Without loss of generality, the quadratic function may be in the following form:

$$g(x,y)=ax^2+bxy+cy^2+dx+ey+f \qquad \text{expression (26)}$$

In some embodiments, $g(x, y)$ is an implicit form derived from a quadratically parameterised curve segment of a glyph outline. To evaluate this $g(x, y)$ function of x and y at each pixel with column and row indices i and j, the vertices of the tessellation triangle may be transformed from the x and y coordinates to the i and j coordinates or indices. Generally speaking, the x and y coordinates may be mapped to the i and j coordinates or indices as follows:

$$\begin{bmatrix} x \\ y \end{bmatrix} = \begin{bmatrix} A & C \\ B & D \end{bmatrix} \begin{bmatrix} i \\ j \end{bmatrix} + \begin{bmatrix} E \\ F \end{bmatrix} \qquad \text{expression (27)}$$

for some A, ... F.

The x and y variables in expression (26) may be replaced with i and j variables based on expression (27). Thus, expression (26) in the x and y coordinates may be equivalently written in the i and j coordinates or indices, as follows:

$$\hat{f}(i, j) = a(Ai + Cj + E)^2 + b(Ai + Cj + E) \qquad \text{expression (28)}$$
$$(Bi + Dj + F) + c(Bi + Dj + F)^2 +$$
$$d(Ai + Cj + E) + e(Bi + Dj + F) + f$$
$$= pi^2 + qij + rj^2 + si + tj + u$$

where $$p=aA^2+bAB+cB^2$$

$$q=2aAC+b(AD+CB)+2cBD$$

$$r=aC^2+bCD+cF^2$$

$$s=2aAE+b(AF+EB)+2cBF+dA+eB$$

$$t=2aCE+b(CF+ED)+2cDF+dC+eD$$

$$u=E^2+EF+F^2+dE+eF+f$$

For every pixel in the tessellation triangle. Along a particular row with the row index j=j̄, expression (28) may be written as $$\hat{f}(i)=Pi^2+Qi+R \qquad \text{expression (29)}$$

where $$P=p$$

$$Q=q\bar{j}+s$$

$$R=r\bar{j}^2+t\bar{j}+u,$$

Accordingly, the following equation holds true:

$$\hat{f}(i+1)-\hat{f}(i)=P(i+1)^2+Q(i+1)+R-Pi^2-Qi-R$$

$$\hat{f}(i+1)=\hat{f}(i)+2Pi+(P+Q) \qquad \text{expression (30)}$$

Thus, if $\hat{f}(i)=f(i, \bar{j})$ has been determined at one end of a row, and if 2P (which equals 2p) and (P+Q) (which is equals to p+q j̄+s) are known or stored for row j̄, each successive value on row j̄ requires one multiply and two additions to compute the next value. Further, moving to the next row j̄+1 merely needs incrementing (P+Q) by q.

Rasterisation may also be performed for other types of lines or segments.

14. Example Computer-Implemented Processes

FIG. 17 illustrates a glyph pre-rendering computer. In an embodiment, a glyph pre-rendering computer 1700 comprises a skeleton generating unit (1702), a transept generation unit (1704), a tessellation unit (1706), and an implicit form generation unit (1708). In an embodiment, units 1702, 1704, 1706 and 1708 are operatively linked with one another and to a glyph rendering data store (1710).

The skeleton generating unit (1702) may be configured to receive data specifying a bounding box of a glyph and a representation of a glyph outline of the glyph, to select a skeleton finding method, and to generate, based at least in part on the received data and the selected method, skeleta comprising skeleton segments and skeleton nodes, as illustrated in FIG. 13A and FIG. 13B. As used herein, a bounding box of a glyph refers to a two-dimensional closed shape that encloses a glyph with space between the glyph's outline and the borderlines of the box, and may be of any geometric shape including, but not limited only to any of, rectangular shapes, circular shapes, irregular shapes, elliptical shapes, polygonal shapes, or other geometric shapes.

The transept generation unit (1704) may be configured to receive the data specifying segments and nodes of the glyph outline, and to generate, based on the received data, transepts at the nodes of the glyph outline, as illustrated in FIG. 12.

The tessellation unit (1706) may be configured to receive data for the skeleta and the transept generated from the skeletonisation unit (1702) and the transept generation unit (1704), select a tessellation method, and to generate, based on the received data and the selected tessellation method, a polygon mesh comprising tessellation polygons containing the segments of the glyph outline, as illustrated in FIG. 15A and FIG. 15B.

The implicit form generation unit (1708) may be configured to receive data for the tessellation polygons from the tessellation unit (1706) and polynomials representing the segments of the glyph outline the transept generated, and to generate, based on the received data, an implicit form for each of the tessellation polygons that contain the segments of the glyph outline.

Glyph rendering data comprising data for the tessellation mesh and the implicit forms may be stored into the glyph rendering data store (1710). The glyph rendering data may be provided to a wide variety of computing devices, software tools, display devices, rendering devices, printing devices, operating systems, web-based applications to render the glyph including one or more specific glyph rendering operations such as anti-aliasing and drop-shadow operations.

In an embodiment, a separate rendering unit, for example a computer system 1900, takes the specification that a particular glyph is to be rendered in a particular location, with specified color characteristics, and against a specified background. (Here, 'location' includes the position of a reference point of the glyph relative to the background, the scale relative to the background, and any transformation such as shear, so that for example the unit can draw any of the i forms in FIG. 2 from the same data drawn from the store 1710, according to the location data.) The rendering unit performs functions such as anti-aliasing according to the location, color and background.

FIG. 18A illustrates a process flow that may be used to generate glyph rendering data for glyphs, according to an example embodiment. In some embodiments, one or more computing devices, for example a computer system 1900 of FIG. 19, may perform this process flow. In the following discussion, reference may also be made to FIG. 17 which illustrates the glyph pre-rendering computer 1700 and components therein that may be used to implement the process flow of FIG. 18A.

In block 1802, the glyph pre-rendering computer 1700, or the tessellation unit 1706 therein, identifies a plurality of candidate tessellation vertices in a bounding box of a glyph, each of the candidate tessellation vertices being away from a glyph outline of the glyph.

In block 1804, the glyph pre-rendering computer 1700, or the tessellation unit 1706 therein, selects a plurality of tessellation vertices from the plurality of candidate tessellation vertices to form a polygon mesh that covers the glyph outline of the glyph.

In block 1806, the glyph pre-rendering computer 1700, or the tessellation unit 1706 and the implicit form generation unit 1708 therein, generates glyph rendering data based at least in part on the polygon mesh.

In an embodiment, the glyph pre-rendering computer 1700, or the skeleton generating unit 1702 therein, constructs skeleta in the bounding box of the glyph based on the glyph outline, the skeleta comprising a first skeleton inside the glyph outline and a second skeleton outside the glyph outline; and identifies a plurality of skeleton nodes to be included in the plurality of candidate tessellation vertices.

In an embodiment, the glyph rendering data generation system 1700 is configured to divide the glyph outline into a plurality of segments that join at a plurality of nodes on the glyph outline, each node in the plurality of nodes representing a point at which at least two segments in the plurality of segments meet; generate a plurality of transepts, each transept in the plurality of transepts passing through an individual node in the plurality of nodes; and identifies a plurality of termination points for the plurality of transepts to be included in the plurality of candidate tessellation vertices.

In an embodiment, the polygon mesh comprises a plurality of tessellation polygons; wherein the glyph outline comprises a plurality of segments. In an embodiment, an individual segment in the plurality of segments is covered by one tessellation polygon in the plurality of tessellation polygons.

In an embodiment, a tessellation polygon in the polygon mesh covers a segment of the glyph outline. In an embodiment, the glyph rendering data generation system 1700 is configured to generate an implicit form for the tessellation polygon.

In an embodiment, the segment of the glyph outline comprises points at which the implicit form equals to zero.

In an embodiment, a value of the implicit form at a point in the tessellation polygon is proportional to a signed distance between the point and the segment of the glyph outline.

In an embodiment, the glyph pre-rendering computer 1700, or the implicit form generation unit 1708, is configured to normalize the implicit form by a factor relating to a gradient, derived from a value field formed by values of the implicit form, at a representative point on the segment of the glyph outline.

In an embodiment, the glyph pre-rendering computer 1700, or the implicit form generation unit 1708, is configured to scale the implicit form to control one or more glyph rendering operations to delineate one or more topological features of the glyph.

In an embodiment, the glyph pre-rendering computer 1700, or the implicit form generation unit 1708, is configured to derive the implicit form from one of straight segment, a quadratic curve, a cubic curve, or other types of curves.

In an embodiment, the polygon mesh does not comprise Bézier polygons.

In an embodiment, the glyph rendering data provides support for proximity tests used by one or more glyph rendering operations comprising at least one of anti-aliasing operations or drop-shadow operations.

In an embodiment, the polygon mesh comprises a network of non-overlapping tessellation triangles.

In an embodiment, the glyph pre-rendering computer 1700 is configured to store the glyph rendering data to be used at runtime, the glyph rendering data comprising tessellation data specifying the plurality of tessellation vertices, and implicit form data specifying a plurality of implicit forms each specifying for a corresponding tessellation polygon that contains a corresponding segment in a plurality of segments of the glyph outline.

FIG. 18B illustrates a process flow that may be used to render glyphs based on glyph rendering data as described herein, according to an example embodiment. In some embodiments, one or more computing devices, for example a computer system 1900 of FIG. 19, may perform this process flow.

In block 1852, a glyph rendering system, which may be, but is not limited only to, the computer system 1900, receives glyph rendering data for a glyph at runtime, the glyph rendering data comprising tessellation data specifying a plurality of tessellation vertices in a bounding box of the glyph, and implicit form data specifying a plurality of implicit forms each specifying for a corresponding tessellation polygon that contains a corresponding segment in a plurality of segments of a glyph outline of the glyph. Here, the tessellation vertices are away from the glyph outline of the glyph.

In block 1854, a glyph rendering system renders the glyph based on the glyph rendering data.

In an embodiment, the tessellation polygon is associated with an implicit form generated from a curve that represents the individual segment. The individual segment may comprise points at which the implicit form equals to zero. In an embodiment, a value of the implicit form at a point in the tessellation polygon is proportional to a signed distance between the point and the individual segment of the glyph outline. The implicit form may be derived, for example, by the glyph rendering data generation system 1700, from one of straight segment, a quadratic curve, a cubic curve, or other types of curves. Data defining the implicit form may be configured in the glyph rendering system at an installation time or at runtime.

In an embodiment, the polygon mesh used to render the glyph by the glyph rendering system does not comprise Bézier polygons.

In an embodiment, the glyph rendering system is configured to perform one or more glyph rendering operations having at least one of anti-aliasing operations or drop-shadow operations as a part of rendering the glyph based on the glyph rendering data. In an embodiment, the glyph rendering data comprises tessellation data specifying the plurality of tessellation vertices, and implicit form data specifying a plurality of implicit forms each specifying for a corresponding tessellation polygon that contains a corresponding segment in a plurality of segments of a glyph outline of the glyph. The glyph rendering data may be derived, for example, by the glyph pre-rendering computer 1700 and provided or downloaded to the glyph rendering system at an installation time or at runtime of the glyph rendering system.

15. Implementation Mechanisms—Hardware Overview

Figure 19:
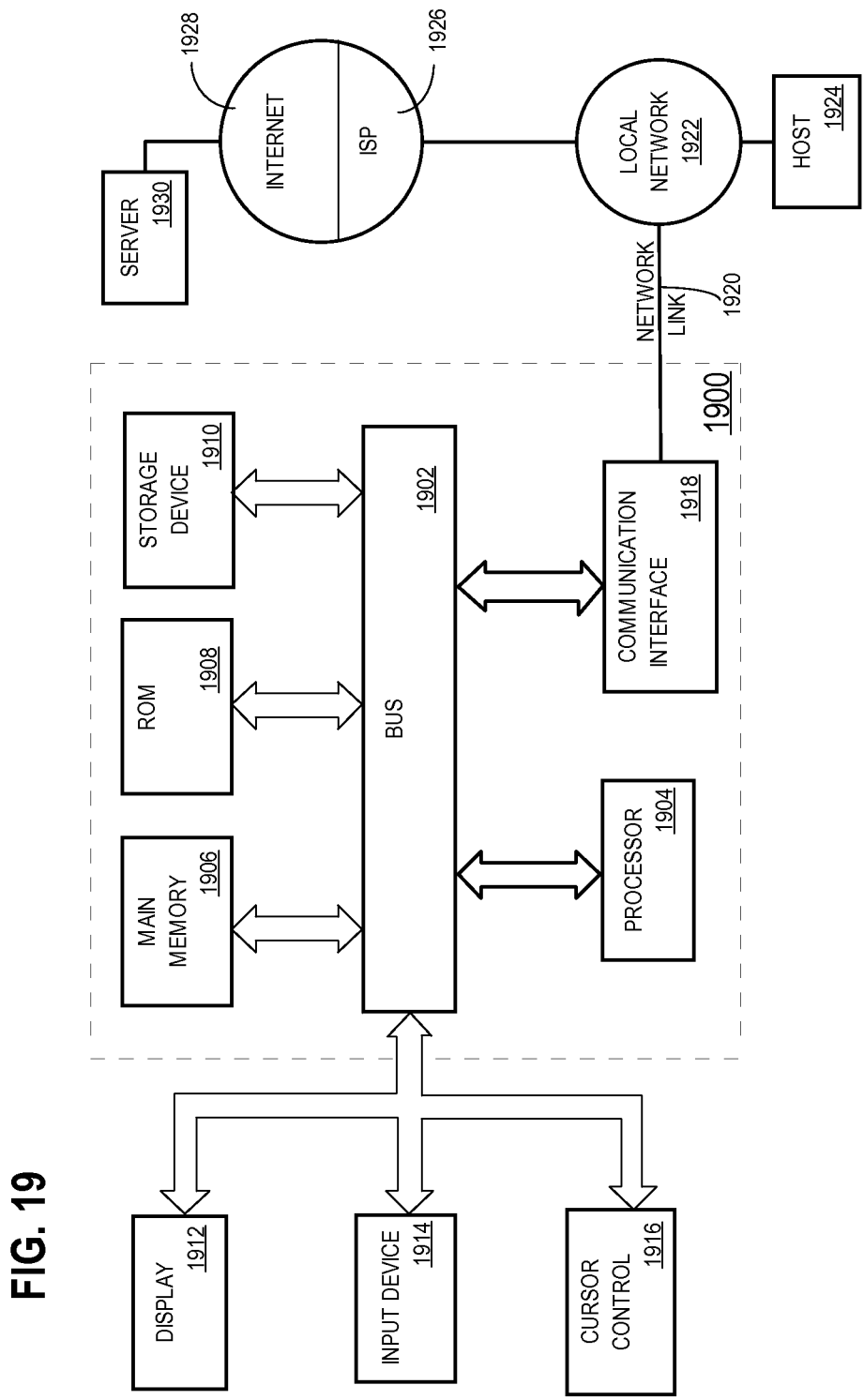
FIG. 19 illustrates a computer system upon which an embodiment may be implemented.

FIG. 19 is a block diagram that illustrates a computer system 1900 upon which an embodiment of the invention may be implemented. Computer system 1900 includes a bus 1902 or other communication mechanism for communicating information, and a processor 1904 coupled with bus 1902 for processing information. Computer system 1900 also includes a main memory 1906, such as a random access memory ("RAM") or other dynamic storage device, coupled to bus 1902 for storing information and instructions to be executed by processor 1904. Main memory 1906 also may be used for storing temporary variables or other intermediate information during execution of instructions to be executed by processor 1904. Computer system 1900 further includes a read only memory ("ROM") 1908 or other static storage device coupled to bus 1902 for storing static information and instructions for processor 1904. A storage device 1910, such as a magnetic disk or optical disk, is provided and coupled to bus 1902 for storing information and instructions.

Computer system 1900 may be coupled via bus 1902 to a display 1912, such as a liquid crystal display ("LCD"), for displaying information to a computer user. An input device 1914, including alphanumeric and other keys, is coupled to bus 1902 for communicating information and command selections to processor 1904. Another type of user input device is cursor control 1916, such as a mouse, trackball, stylus, or cursor direction keys for communicating direction information and command selections to processor 1904 and for controlling cursor movement on display 1912. This input device typically has two degrees of freedom in two axes, a first axis (for example, x) and a second axis (for example, y), that allows the device to specify positions in a plane.

The invention is related to the use of computer system 1900 for automatically creating audiovisual works. According to one embodiment of the invention, automatically creating audiovisual works is provided by computer system 1900 in response to processor 1904 executing one or more sequences of one or more instructions contained in main memory 1906. Such instructions may be read into main memory 1906 from another computer-readable medium, such as storage device 1910. Execution of the sequences of instructions contained in main memory 1906 causes processor 1904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1904 for execution. Such a medium may take many forms, including but not limited to, non-volatile media, volatile media, and transmission media. Non-volatile media includes, for example, optical or magnetic disks, such as storage device 1910. Volatile media includes dynamic memory, such as main memory 1906. Transmission media includes coaxial cables, copper wire and fiber optics, including the wires that comprise bus 1902. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1904 for execution. For example, the instructions may initially be carried on a magnetic disk of a remote computer. The remote computer can load the instructions into its dynamic memory and send the instructions over a telephone line using a modem. A modem local to computer system 1900 can receive the data on the telephone line and use an infrared transmitter to convert the data to an infrared signal. An infrared detector can receive the data carried in the infrared signal and appropriate circuitry can place the data on bus 1902. Bus 1902 carries the data to main memory 1906, from which processor 1904 retrieves and executes the instructions. The instructions received by main memory 1906 may optionally be stored on storage device 1910 either before or after execution by processor 1904.

Computer system 1900 also includes a communication interface 1918 coupled to bus 1902. Communication interface 1918 provides a two-way data communication coupling to a network link 1920 that is connected to a local network 1922. For example, communication interface 1918 may be an integrated services digital network ("ISDN") card or a modem to provide a data communication connection to a corresponding type of telephone line. As another example, communication interface 1918 may be a local area network ("LAN") card to provide a data communication connection to a compatible LAN. Wireless links may also be implemented. In any such implementation, communication interface 1918 sends and receives electrical, electromagnetic or optical signals that carry digital data streams representing various types of information.

Network link 1920 typically provides data communication through one or more networks to other data devices. For example, network link 1920 may provide a connection through local network 1922 to a host computer 1924 or to data equipment operated by an Internet Service Provider ("ISP") 1926. ISP 1926 in turn provides data communication services through the world wide packet data communication network now commonly referred to as the "Internet" 1928. Local network 1922 and Internet 1928 both use electrical, electromagnetic or optical signals that carry digital data streams. The signals through the various networks and the signals on network link 1920 and through communication interface 1918, which carry the digital data to and from computer system 1900, are exemplary forms of carrier waves transporting the information.

Computer system 1900 can send messages and receive data, including program code, through the network(s), network link 1920 and communication interface 1918. In the Internet example, a server 1930 might transmit a requested code for an application program through Internet 1928, ISP 1926, local network 1922 and communication interface 1918. In accordance with the invention, one such downloaded application provides for automatically creating audiovisual works as described herein.

The received code may be executed by processor 1904 as it is received, and/or stored in storage device 1910, or other non-volatile storage for later execution. In this manner, computer system 1900 may obtain application code in the form of a carrier wave.

16. Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer implemented method, comprising:
   identifying a plurality of candidate tessellation vertices in a bounding box of a glyph, each of the candidate tessellation vertices being away from a glyph outline of the glyph;
   selecting a plurality of tessellation vertices from the plurality of candidate tessellation vertices to form a polygon mesh that covers the glyph outline of the glyph;
   generating glyph rendering data based at least in part on the polygon mesh;
   wherein the method is performed by one or more computing devices.

2. The method of claim 1, further comprising:
   constructing skeleta in the bounding box of the glyph based on the glyph outline, the skeleta comprising a first skeleton inside the glyph outline and a second skeleton outside the glyph outline; and
   identifying a plurality of skeleton nodes to be included in the plurality of candidate tessellation vertices.

3. The method of claim 1, further comprising:
   dividing a specification of the glyph outline into a plurality of segments that join at a plurality of nodes on the glyph outline, each node in the plurality of nodes representing a point at which at least two segments in the plurality of segments meet;
   generating a plurality of transepts, each transept in the plurality of transepts passing through an individual node in the plurality of nodes; and
   identifying a plurality of termination points for the plurality of transepts to be included in the plurality of candidate tessellation vertices.

4. The method of claim 1, wherein the polygon mesh comprises a plurality of tessellation polygons; wherein the glyph outline comprises a plurality of segments; and wherein an individual segment in the plurality of segments is covered by one tessellation polygon in the plurality of tessellation polygons, each polygon containing at most one segment of the glyph outline.

5. The method of claim 1, wherein a tessellation polygon in the polygon mesh covers a segment of the glyph outline, further comprising generating an implicit form for the tessellation polygon.

6. The method of claim 5, wherein the segment of the glyph outline comprises points at which the implicit form is equal to zero.

7. The method of claim 5, wherein a value of the implicit form at a point in the tessellation polygon is approximately proportional to a signed distance between the point and the segment of the glyph outline.

8. The method of claim 5, further comprising normalizing the implicit form by a factor relating to a gradient, derived from a value field formed by values of the implicit form, at a representative point on the segment of the glyph outline.

9. The method of claim 5, further comprising scaling the implicit form to control one or more glyph rendering operations to delineate one or more topological features of the glyph.

10. The method of claim 5, further comprising deriving the implicit form from one of straight segment, a quadratic curve, a cubic curve, or other types of curves.

11. The method of claim 1, wherein the polygon mesh does not include Bézier polygons.

12. The method of claim 1, wherein the glyph rendering data provides support for proximity tests used by one or more glyph rendering operations comprising at least one of anti-aliasing operations or drop-shadow operations.

13. The method of claim 1, wherein the polygon mesh comprises a network of tessellation triangles.

14. The method of claim 1, further comprising storing the glyph rendering data to be used at runtime, the glyph rendering data comprising tessellation data specifying the plurality of tessellation vertices, and implicit form data specifying a plurality of implicit forms each specifying for a corresponding tessellation polygon that contains a corresponding segment in a plurality of segments of the glyph outline.

15. A computer-implemented method, comprising:
receiving glyph rendering data for a glyph at runtime, the glyph rendering data comprising tessellation data specifying a plurality of tessellation vertices in a bounding box of the glyph, and implicit form data specifying a plurality of implicit forms each specifying for a corresponding tessellation polygon that contains a corresponding segment in a plurality of segments of a glyph outline of the glyph, wherein the plurality of tessellation vertices are away from the glyph outline of the glyph;
rendering the glyph based on the glyph rendering data;
wherein the method is performed by one or more computing devices.

16. The method of claim 15, wherein the polygon mesh comprises a plurality of tessellation polygons; wherein the glyph outline comprises a plurality of segments; and wherein an individual segment in the plurality of segments is covered by a tessellation polygon in the plurality of tessellation polygons.

17. The method of claim 16, wherein the tessellation polygon is associated with an implicit form generated from a curve that represents the individual segment.

18. The method of claim 17, wherein the individual segment comprises points at which the implicit form equals to zero.

19. The method of claim 17, wherein a value of the implicit form at a point in the tessellation polygon is approximately proportional to a signed distance between the point and the individual segment of the glyph outline.

20. The method of claim 17, wherein the implicit form is derived from one of straight segment, a quadratic curve, a cubic curve, or other types of curves.

21. The method of claim 15, wherein the polygon mesh does not comprise Bézier polygons.

22. The method of claim 15, further comprising performing one or more glyph rendering operations having at least one of anti-aliasing operations or drop-shadow operations as a part of rendering the glyph based on the glyph rendering data.

23. The method of claim 15, wherein the glyph rendering data comprises tessellation data specifying the plurality of tessellation vertices, and implicit form data specifying a plurality of implicit forms each specifying for a corresponding tessellation polygon that contains a corresponding segment in a plurality of segments of a glyph outline of the glyph.

24. A non-transitory computer-readable storage medium carrying one or more sequences of instructions, which instructions, when executed by one or more processors, cause the one or more processors to perform:
identifying a plurality of candidate tessellation vertices in a bounding box of a glyph, each of the candidate tessellation vertices being away from a glyph outline of the glyph;
selecting a plurality of tessellation vertices from the plurality of candidate tessellation vertices to form a polygon mesh that covers the glyph outline of the glyph; and
generating glyph rendering data based at least in part on the polygon mesh.

25. The non-transitory computer-readable storage medium of claim 24, wherein the one or more sequences of instructions further comprise instructions which, when executed by one or more processors, cause the one or more processors to perform:
constructing skeleta in the bounding box of the glyph based on the glyph outline, the skeleta comprising a first skeleton inside the glyph outline and a second skeleton outside the glyph outline; and
identifying a plurality of skeleton nodes to be included in the plurality of candidate tessellation vertices.

26. The non-transitory computer-readable storage medium of claim 24, wherein the one or more sequences of instructions further comprise instructions which, when executed by one or more processors, cause the one or more processors to perform:
dividing the glyph outline into a plurality of segments that join at a plurality of nodes on the glyph outline, each node in the plurality of nodes representing a point at which at least two segments in the plurality of segments meet;
generating a plurality of transepts, each transept in the plurality of transepts passing through an individual node in the plurality of nodes; and
identifying a plurality of termination points for the plurality of transepts to be included in the plurality of candidate tessellation vertices.

27. The non-transitory computer-readable storage medium of claim 24, wherein a tessellation polygon in the polygon mesh covers a segment of the glyph outline; and wherein the one or more sequences of instructions further comprise instructions which, when executed by one or more processors, cause the one or more processors to perform generating an implicit form for the segment within the tessellation polygon.

28. A non-transitory computer-readable storage medium carrying one or more sequences of instructions, which instructions, when executed by one or more processors, cause the one or more processors to perform:
receiving glyph rendering data for a glyph at runtime, the glyph rendering data comprising tessellation data specifying a plurality of tessellation vertices in a bounding box of the glyph, and implicit form data specifying a plurality of implicit forms each specifying for a corresponding tessellation polygon that contains a corresponding segment in a plurality of segments of a glyph outline of the glyph, wherein the plurality of tessellation vertices are away from the glyph outline of the glyph; and
rendering the glyph based on the glyph rendering data.

29. The non-transitory computer-readable storage medium of claim 28, wherein the polygon mesh comprises a plurality of tessellation polygons; wherein the glyph outline comprises a plurality of segments; and wherein an individual segment in the plurality of segments is covered by a tessellation polygon in the plurality of tessellation polygons.

30. The non-transitory computer-readable storage medium of claim 29, wherein the tessellation polygon is associated with an implicit form generated from a curve that represents the individual segment.

31. The non-transitory computer-readable storage medium of claim 30, wherein a value of the implicit form at a point in the tessellation polygon is approximately proportional to a signed distance between the point and the individual segment of the glyph outline.

32. The non-transitory computer-readable storage medium of claim 30, wherein the implicit form is derived from one of straight segment, a quadratic curve, a cubic curve, or other types of curves.

33. The non-transitory computer-readable storage medium of claim 28, wherein the one or more sequences of instructions further comprise instructions which, when executed by one or more processors, cause the one or more processors to perform one or more glyph rendering operations having at least one of anti-aliasing operations or drop-shadow operations as a part of rendering the glyph based on the glyph rendering data.

34. The non-transitory computer-readable storage medium of claim 28, wherein the glyph rendering data comprises tessellation data specifying the plurality of tessellation vertices, and implicit form data specifying a plurality of implicit forms each specifying for a corresponding tessellation polygon that contains a corresponding segment in a plurality of segments of a glyph outline of the glyph.

* * * * *